US007788322B2

(12) United States Patent
Busey

(10) Patent No.: US 7,788,322 B2
(45) Date of Patent: Aug. 31, 2010

(54) METHOD, SYSTEM AND COMPUTER PROGRAM PRODUCT FOR CATALOGING CONTENT ON A GLOBAL COMPUTER NETWORK

(75) Inventor: Andrew Thomas Busey, Austin, TX (US)

(73) Assignee: Demand Media, Inc., Santa Monica, CA (US)

( * ) Notice: Subject to any disclaimer, the term of this patent is extended or adjusted under 35 U.S.C. 154(b) by 200 days.

(21) Appl. No.: 11/956,192

(22) Filed: Dec. 13, 2007

(65) Prior Publication Data

US 2008/0091797 A1    Apr. 17, 2008

Related U.S. Application Data

(63) Continuation of application No. PCT/US2006/023572, filed on Jun. 16, 2006.

(60) Provisional application No. 60/691,183, filed on Jun. 16, 2005.

(51) Int. Cl.
*G06F 13/00* (2006.01)

(52) U.S. Cl. ...................................... 709/203

(58) Field of Classification Search .................. 709/203
See application file for complete search history.

(56) References Cited

U.S. PATENT DOCUMENTS

| 5,826,025 | A | 10/1998 | Gramlich |
| 6,009,429 | A | 12/1999 | Greer et al. |
| 6,892,352 | B1 | 5/2005 | Myers |
| 7,617,130 | B2 * | 11/2009 | Bezos et al. .................. 705/26 |
| 2002/0019856 | A1 * | 2/2002 | Bezos et al. ................ 709/218 |
| 2004/0075682 | A1 | 4/2004 | Burleson |

OTHER PUBLICATIONS

Olsen, S., "Yahoo hints at social networking service", CNET News. com, Apr. 7, 2004, pp. 1-3, CNET Networks, Inc.

* cited by examiner

*Primary Examiner*—Robert B Harrell
(74) *Attorney, Agent, or Firm*—Greenberg Traurig, LLP

(57) ABSTRACT

On a display device, within at least one web browser window, an information handling system displays a first web page that is associated with an address of a second web page. The first web page includes commentary about the second web page by one or more human reviewers. The first web page is so displayed on the display device in response to a selection by a user of at least one of the following: a command that is displayed on the display device within a web browser toolbar, in association with the second web page; and a hyperlink that is displayed on the display device within a third web page, in association with the second web page.

37 Claims, 48 Drawing Sheets

SHADOWS

Tag Your Bookmarks                                   Step 3 of 3

Here is a list of all your bookmarks. You can now assign tags to them. When you add tags, you will be able to find them by searching with the shadows toolbar for those tags. This will also show you sites others in the Shadows community have tagged with the same words.

CNN International — 308

Tag(s): [News] — 310

The New York Times Online

Tag(s): [News]

Latest Business News and Financial Information | Reuters.com

Tag(s): [News]

Welcome to Engrish.com

Tag(s): [News & Satire]

The Onion | America's Finest News Source

Tag(s): [Humor & Satire]

Opinions You Should have

Tag(s): [Humor & Satire]

Archie McPhee & Co. - Outfitters of Popular Culture

Tag(s): [Shopping]

Amazon.com: Online shopping for electronics, apparel, music, books, DVDs & more

Tag(s): [Shopping]

eBay - New & used electronics, cars, apparel, collectibles, sporting goods & more at low prices

Tag(s): [Shopping]

[Submit]

| SHADOWS | Welcome, shadowsuser |
| --- | --- |
| | log out \| my Shadows page |

My Shadows
View my public User Page   \|   Edit my account

Latest Feeds for My Favorite Tags

| cool | news | shopping | history | humor | eBay - New & used electronics, cars, apparel, collectibles, sporting goods & more - SP Amazon.com: Online shopping for electronics, apparel, music, books, DVDs & more - SP PC Connection - Desktop Notebook Laptop Printers Cameras Servers - SP Powell's Books - Used Books, Rare Books, New Books, and Out of Print Books - SP Welcome to Archie McPhee: Outfitters of Popular Culture - SP more »

Most Recently Tagged Pages

CNN International - Cable News Network ****
Tagged by 4133 users - most recent: 4/26/05 by beeblebrox
Also tagged as: news - funny - cool - political - satire   more tags >
cnn-international.com/topstories/ - View Shadow page

CNN - Cable News Network ***
Tagged by 4133 users - most recent: 4/26/05 by beeblebrox
Also tagged as: news - funny - cool - political - satire   more tags >
cnn-international.com/topstories/ - View Shadow page

CNN News **
Tagged by 4133 users - most recent: 4/26/05 by beeblebrox
Also tagged as: news - funny - cool - political - satire   more tags >
cnn-international.com/topstories/ - View Shadow page more »

🔍 Search Tags

[          ] [Go]

Ads by Gooooooogle

Environment Blog
Bestselling author T.A. Barron shares his views on the environment
blog.nrdcactionfund.org AllWebCo Design Templates
Complete websites with Flash Basic HTML Designs, Multiple Pages
http://allwebco-templates.com Instant Web Design
Make your own website quickly Includes everything you need.
www.SiteRightNow.com Free Blog
Create Your Own Blog - Its Free Post, Publish, Get Feedback
www.MyBlogSite.com How to Create a Free Blog
Free report shows you exactly how to create your blog in minutes
www.Free-Targeted-Traffic.com About   \|   Terms of Service   \|   My Account

FROM FIG. 8A-1

Community results

CNN International - Cable News Network ****
4133 users - Last Action: 4/26/05 by beeblebrox
Also tagged as: news - funny - cool - political - satire  more tags»
cnn-international.com/topstories/ - View Shadow page

CNN - Cable News Network ***
4133 users - Last Action: 4/26/05 by beeblebrox
Also tagged as: news - funny - cool - political - satire  more tags»
cnn-international.com/topstories/ - View Shadow page

CNN News **
4133 users - Last Action: 4/26/05 by beeblebrox
Also tagged as: news - funny - cool - political - satire  more tags»
cnn-international.com/topstories/ - View Shadow page

CNN International - Cable News Network ****
4133 users - Last Action: 4/26/05 by beeblebrox
Also tagged as: news - funny - cool - political - satire  more tags»
cnn-international.com/topstories/ - View Shadow page

CNN - Cable News Network ***
4133 users - Last Action: 4/26/05 by beeblebrox
Also tagged as: news - funny - cool - political - satire  more tags»
cnn-international.com/topstories/ - View Shadow page Displaying 10 of 28 results:  • 1 2 3 •

810

Get the Shadows toolbar: [SHADOWS]

Get an RSS feed of my tags:
[+] Pluck   [XML]

About | Terms of Service | My Account

| SHADOWS | Welcome, shadowsuser |
| --- | --- |
| | log out \| my Shadows page |

Tag: news  [Find in Google]

Narrow results:  informative   hot   breaking   current   events
*clear tags*

Top Users of this Tag:
shadowsuser | zAph0d | jerseygirl | tawanda | mister.ed

My results
Log in to see items you have tagged with "news".

If you do not have a Shadows account, create an account now to begin using tags, ratings and comments and to share your comments with others.

Community results

CNN International - Cable News Network **
4133 users - Last Action: 4/26/05 by beeblebrox
Also tagged as: news - funny - cool - political - satire   more tags »
cnn-international.com/topstories/ - View Shadow page

CNN - Cable News Network *
4133 users - Last Action: 4/26/05 by beeblebrox
Also tagged as: news - funny - cool - political - satire   more tags »
cnn-international.com/topstories/ - View Shadow page

CNN News **
4133 users - Last Action: 4/26/05 by beeblebrox
Also tagged as: news - funny - cool - political - satire   more tags »
cnn-international.com/topstories/ - View Shadow page

CNN International - Cable News Network **
4133 users - Last Action: 4/26/05 by beeblebrox
Also tagged as: news - funny - cool - political - satire   more tags »
cnn-international.com/topstories/ - View Shadow page

CNN - Cable News Network *
4133 users - Last Action: 4/26/05 by beeblebrox
Also tagged as: news - funny - cool - political - satire   more tags »
cnn-international.com/topstories/ - View Shadow page Displaying 10 of 28 results:  • 1  2  3 •

Get the Shadows toolbar: [SHADOWS]

Search Tags
[          ] [Go]

Ads by Goooooogle

Environment Blog
Bestselling author T.A.
Barron shares his views
on the environment
blog.nrdcactionfund.org AllWebCo Design
Templates
Complete websites with
Flash Basic HTML
Designs, Multiple Pages
http://allwebco-templates.com Instant Web Design
Make your own website
quickly Includes
everything you need.
www.SiteRightNow.com Free Blog
Create Your Own Blog -
Its Free Post, Publish,
Get Feedback
www.MyBlogSite.com How to Create a Free
Blog
Free report shows you
exactly how to create
your blog in minutes
www.Free-Targeted-Traffic.com Get an RSS feed of my tags:
[+] Pluck   [XML]

About  |  Terms of Service  |  My Account

| SHADOWS | Welcome, shadowsuser |
| --- | --- |
| | log out \| my Shadows page |

Tag: news [Find in Google]

Narrow results: informative  hot  breaking  current  events
*clear tags*

Top Users of this Tag:
shadowsuser | zAph0d | jerseygirl | tawanda | mister.ed

My results                                           my Shadows page
You have not tagged any items with "news."

Community results

CNN International - Cable News Network \*\*\*\*
4133 users - Last Action: 4/26/05 by beeblebrox
Also tagged as: news - funny - cool - political - satire  more tags »
cnn-international.com/topstories/ - View Shadow page

CNN - Cable News Network \*\*\*
4133 users - Last Action: 4/26/05 by beeblebrox
Also tagged as: news - funny - cool - political - satire  more tags »
cnn-international.com/topstories/ - View Shadow page

CNN News \*\*
4133 users - Last Action: 4/26/05 by beeblebrox
Also tagged as: news - funny - cool - political - satire  more tags »
cnn-international.com/topstories/ - View Shadow page

CNN International - Cable News Network \*\*\*\*
4133 users - Last Action: 4/26/05 by beeblebrox
Also tagged as: news - funny - cool - political - satire  more tags »
cnn-international.com/topstories/ - View Shadow page

CNN - Cable News Network \*\*\*
4133 users - Last Action: 4/26/05 by beeblebrox
Also tagged as: news - funny - cool - political - satire  more tags »
cnn-international.com/topstories/ - View Shadow page Displaying 10 of 28 results:  • 1  2  3 •

Get the Shadows toolbar: [SHADOWS]

Search Tags
[                    ]
[Go]

Ads by Goooooogle

Environment Blog
Bestselling author T.A.
Barron shares his views
on the environment
blog.nrdcactionfund.org AllWebCo Design
Templates
Complete websites with
Flash Basic HTML
Designs, Multiple Pages
http://allwebco-templates.com Instant Web Design
Make your own website
quickly Includes
everything you need.
www.SiteRightNow.com Free Blog
Create Your Own Blog -
Its Free Post, Publish,
Get Feedback
www.MyBlogSite.com How to Create a Free
Blog
Free report shows you
exactly how to create
your blog in minutes
www.Free-Targeted-Traffic.com Get an RSS feed of my
tags:
[+] Pluck   [XML]

About | Terms of Service | My Account

*FIG. 8C*

FROM FIG. 11A

Nothing true in this article ☆
Author: johnpluck
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.... more »
Posted March 21, 2005 2:34pm Report abuse

[See all comments] ~1108

Vote for an UberTag
- Hot
- Breaking
- News
- Deal
- Trainwreck

1104

Subscribe to updates for this Shadow page: [XML]

[+ Pluck]

Top Feeds for this Domain
- CNN Latest News Headlines [+ Pluck] [XML]
- CNN Science and Technology News [+ Pluck] [XML]
- CNN Money & Business [+ Pluck] [XML]
- CNN Entertainment [+ Pluck] [XML]

~1114

Get Feedback
www.MyBlogSite.com

How to Create a Free Blog
Free report shows you exactly how to create your blog in minutes
www.Free-Targeted-Traffic.com About | Terms of Service | My Account

SHADOWS

Welcome, shadowsuser
log out | my Shadows page

Search Shadows
[Go]

Tags what's this?

Tag this site
Tag Rank: #4
Tagged by: 2366 people

Top 10 Tags:
news: 1632 people
cool: 1366 people
interesting: 1128 people
informative: 1092 people
business: 1032 people
humor: 866 people
hot: 628 people
breaking: 592 people
weird: 432 people
information: 266 people more tags »

CNN: "Sloppy Desk, Sloppy Work"
http://www.cnn.com/2005/US/Careers/04/15/spring.cleaning/index.html Post a comment
Displaying 11-20 of 27 results • 1 2 3 •

Comments

Not bad, but they sure are slow
Author: barrypluck - posted March 21, 2005 2:34pm - Report abuse
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.... Respond to this comment 💬 27 responses:

I completely agree
Author: shadowsuser - posted March 21, 2005 2:34pm - Report abuse
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.

Nothing you say is true
Author: zAph0d - posted March 21, 2005 2:34pm - Report abuse
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.

Tell A Friend
Their email address:
[Send]

Ads by Gooooogle

Environment Blog
Bestselling author T.A. Barron shares his views on the environment
blog.nrdcactionfund.org AllWebCo Design Templates
Complete websites with Flash Basic HTML Designs, Multiple Pages
http://allwebco-templates.com Instant Web Design
Make your own website quickly Includes everything you need.
www.SiteRightNow.com

FROM FIG. 14A

Vote for an UberTag

- 🔲 Hot
- 🔍 Breaking
- ⭐ News
- ❯ Deal
- 💾 Trainwreck
- 📁 Recommended

CNN is the best! I love them!
Author: tawanda – posted March 21, 2005  2:34pm – <u>Report abuse</u>
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.

I completely agree
Author: shadowsuser – posted March 21, 2005  2:34pm – <u>Report abuse</u>
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.

Nothing you say is true
Author: zAph0d – posted March 21, 2005  2:34pm – <u>Report abuse</u>
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.

CNN is the best! I love them!
Author: tawanda – posted March 21, 2005  2:34pm – <u>Report abuse</u>
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.

<u>Free Blog</u>
Create Your Own Blog – Its Free Post, Publish, Get Feedback
www.MyBlogSite.com <u>How to Create a Free Blog</u>
Free report shows you exactly how to create your blog in minutes
www.Free-Targeted-Traffic.com Subscribe to updates for this Shadow page:

[+] Pluck   [XML]

1400

Displaying 11–20 of 27 results  • 1  2  3 •

About  |  Terms of Service  |  My Account

| SHADOWS | Welcome, shadowsuser |
| | log out \| my Shadows page |

Send: CNN: "Sloppy Desk, Sloppy Work"  1504

Email to: [                    ]
Enter email addresses, separated by commas.

Your name: [                    ]
(optional)

1502

Your email: [                    ]

Message: [                    ]
(optional)

☐ Send me a copy    [Submit]

These email addresses will be used to email the information on your behalf and will not be shared or used for any marketing purposes.

🔍 Search Tags
[          ] [Go]

Ads by Goooooogle

Environment Blog
Bestselling author T.A.
Barron shares his views
on the environment
blog.nrdcactionfund.org AllWebCo Design
Templates
Complete websites with
Flash Basic HTML
Designs, Multiple Pages
http://allwebco-templates.com Instant Web Design
Make your own website
quickly Includes
everything you need.
www.SiteRightNow.com Free Blog
Create Your Own Blog -
Its Free Post, Publish,
Get Feedback
www.MyBlogSite.com How to Create a Free
Blog
Free report shows you
exactly how to create
your blog in minutes
www.Free-Targeted-Traffic.com About | Terms of Service | My Account

FROM FIG. 16A

CNN News **
4133 users - Last Action: 4/26/05 by beeblebrox
Also tagged as: news - funny - cool - political - satire  more tags »
cnn-international.com/topstories/ - View Shadow page

CNN International - Cable News Network ****
4133 users - Last Action: 4/26/05 by beeblebrox
Also tagged as: news - funny - cool - political - satire  more tags »
cnn-international.com/topstories/ - View Shadow page

CNN - Cable News Network ***
4133 users - Last Action: 4/26/05 by beeblebrox
Also tagged as: news - funny - cool - political - satire  more tags »
cnn-international.com/topstories/ - View Shadow page Displaying 10 of 28 results:  • 1  2  3  •

Get the Shadows toolbar:  SHADOWS

About  |  Terms of Service  |  My Account

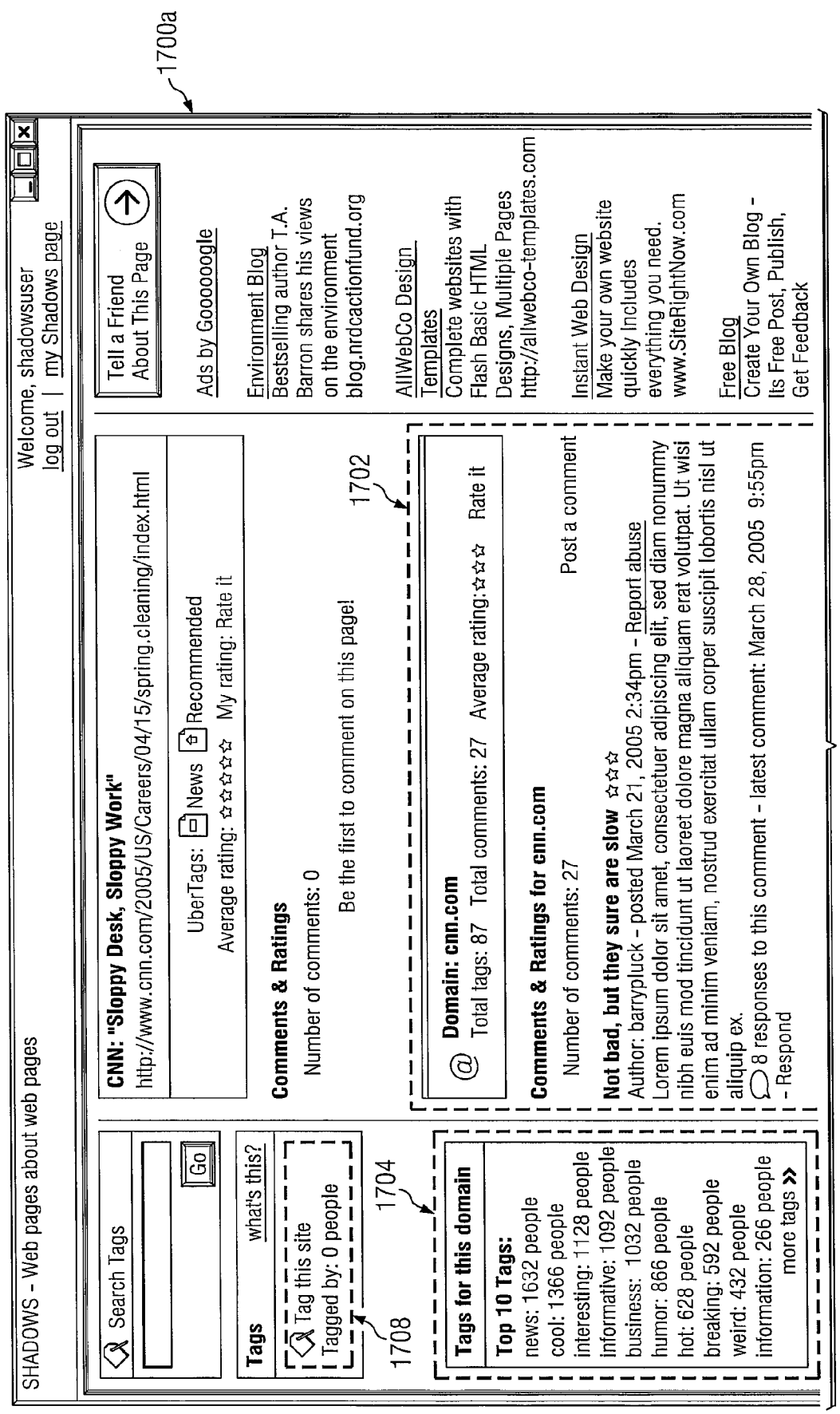

FROM FIG. 17A-1

─ 1700a www.MyBlogSite.com

CNN is the best! I love them! ☆☆☆☆☆
Author: andrewpluck - posted March 21, 2005 2:34pm – Report abuse
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.
⌕ 6 responses to this comment – latest comment: March 28, 2005  9:55pm
- Respond

Nothing true in this article ☆
Author: johnpluck - posted March 21, 2005 2:34pm – Report abuse
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex.
⌕ 4 responses to this comment – latest comment: March 28, 2005  9:55pm
- Respond See all comments »

─ 1702

How to Create a Free Blog
Free report shows you exactly how to create your blog in minutes
www.Free-Targeted-Traffic.com Subscribe to updates for this Shadow page:
[+] Pluck   [XML]

Vote for an UberTag
(what's this?)
[ ] Hot
[ ] Breaking
[ ] News
[ ] Deal
[ ] Trainwreck
[ ] Recommended

─ 1706

About | Terms of Service | My Account

*FIG. 17A-2*

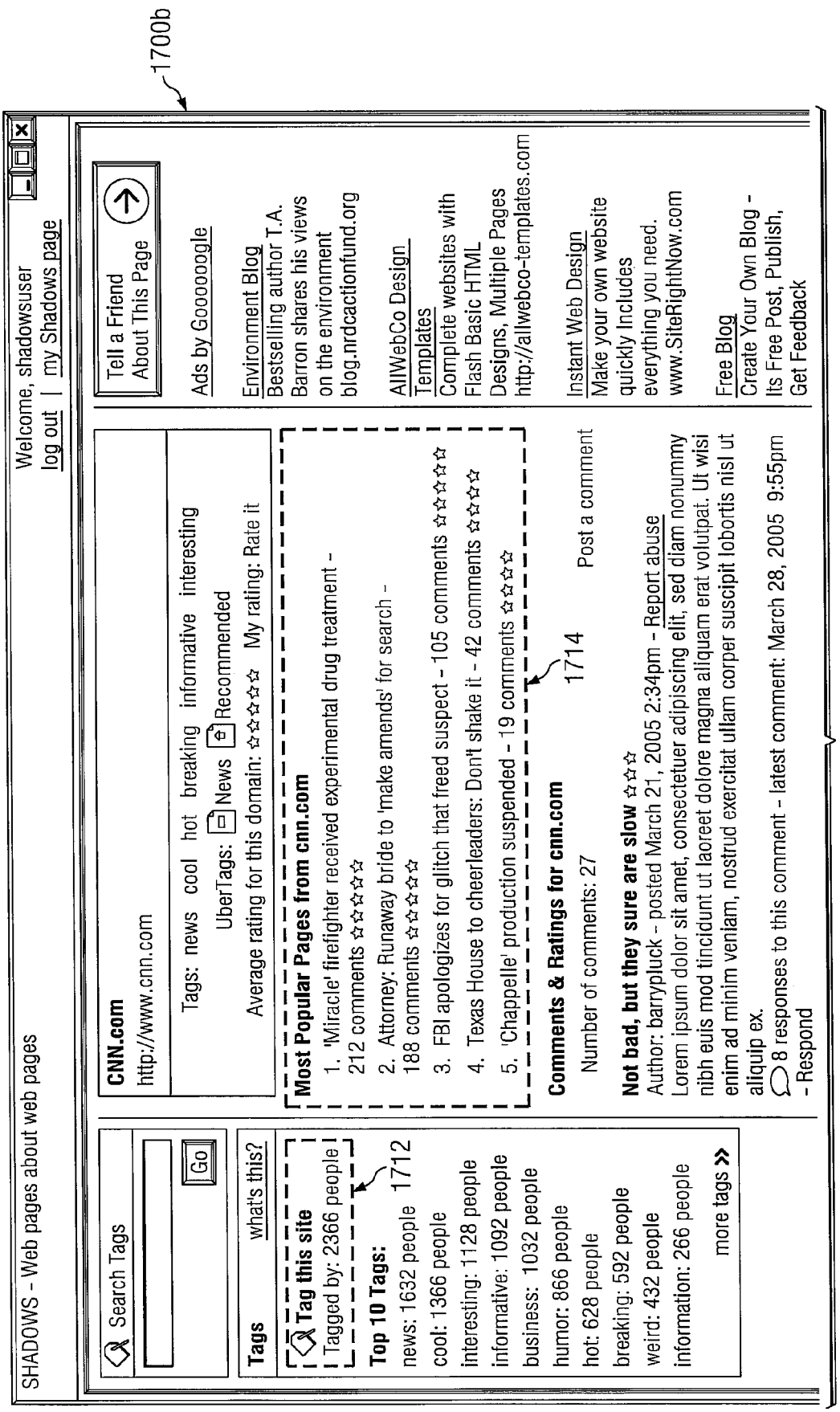

FROM FIG. 17B-1

CNN is the best! I love them! ☆☆☆☆
Author: andrewpluck - posted March 21, 2005 2:34pm - Report abuse
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex
💬 6 responses to this comment - latest comment: March 28, 2005 9:55pm
- Respond

Nothing true in this article ☆
Author: johnpluck - posted March 21, 2005 2:34pm - Report abuse
Lorem ipsum dolor sit amet, consectetuer adipiscing elit, sed diam nonummy nibh euis mod tincidunt ut laoreet dolore magna aliquam erat volutpat. Ut wisi enim ad minim veniam, nostrud exercitat ullam corper suscipit lobortis nisl ut aliquip ex
💬 4 responses to this comment - latest comment: March 28, 2005 9:55pm
- Respond See all comments »

Vote for an UberTag
(what's this?)
▫ Hot
▫ Breaking
▫ News
▫ Deal
▫ Trainwreck
▫ Recommended

1710 www.MyBlogSite.com

How to Create a Free Blog
Free report shows you exactly how to create your blog in minutes
www.Free-Targeted-Traffic.com Subscribe to updates for this Shadow page:
[+] Pluck   [XML]

About | Terms of Service | My Account

FROM FIG. 23A

Share your thoughts
Write a review,
write a *So You'd Like to... guide*
e-mail a friend about this item Andreina M. Fer...

16 used & new available from $189.99

See 9 customer images
Share your own customer images

A9  Instant Reward Off.
Learn how to reactivate.

MORE BUYING CHOICES

J&R Music and Computer World
Price: $219.95
Availability: Usually ships in 1-2 business days

[Add to Cart]

TigerDirect
Price: $234.99
Availability: Usually ships in 1-2 business days

[Add to Cart]

Target

Manufacturers, merchants, and enthusiasts: Submit a product manual for this item.

Technical Data | Important Information |
Customer Reviews | Product Description | Accessories

Customers who viewed this item also viewed

RECENTLY VIEWED

- Exalted by White Wolf
- A Breath of Snow and Ashes (Outlander) by Diana Gabaldon
- Don't Make Me Internet ← 2300

Epinions.com
a Shopping.com company

Read Reviews
Showing 1-3 of 3 reviews

| Sort by<br>Product Rating | Sort by<br>Review Date | |
|---|---|---|
| Product Rating:<br>☆☆☆☆ | One remote to rule them all...<br>by fuse, Oct 22 '05<br>Pros: Setup could not be easier, flexibility, a true universal remote<br>Cons: Price, no RF, button feel, somewhat awkward in size<br><br>My first foray into the universal remote control world was the Kameleon 8 in 1 universal remote. Pretty cool concept, but if you had a cable box DVR (in other words, an integrated tuner/PVR type solution), the Kameleon fell short. Don't get me wrong. The ...<br>Read this full review | |
| Product Rating:<br>☆☆☆☆ | Almost perfect!<br>by nwcubsfan new, Oct 15 '05<br>Pros: Easy setup, controls 15 components, rechargeable, custom LCD, easy for visitors to use my system.<br>Cons: CHAN and VOL buttons are not well defined. | | amazon.com 13 of 16 people found the following review helpful:

☆☆☆☆ Can't Dumb it Down Enough for Mom, September 2, 2005
Reviewer: Robert Salita (Chicago, IL USA) - See all my reviews
REAL NAME Mom is a senior. She is baffled by complexity. I'm able to make this device easier, more foolproof, then other remote controls that we've tried. We're still not there yet.

Making this device simple takes time and expertise. Logitech has some outright bugs and lack of features that prevent this device from being even simpler. I've sent them feedback but this really isn't their target market. I told mom not to hold her breath. She can't anyway.

The screen quality is improved over previous models but it's still a bit disappointing. Her old eyes have trouble reading the button labels and small screen fonts. Like others, I'm not in love with the button layout.

Was this review helpful to you? [Yes] [No] (Report this)

TO FIG. 24B

FROM FIG. 24A

| | |
|---|---|
| | Harmony 880 Review I has always heard of the Harmony brand and most of the reviews from friends and family had bee raving. I decided to upgrade out of my Sony VL900 and into something with more buttons and features. I generally try not to buy ...<br>Read this full review |
| | Express Reviews |
| Product Rating:<br>☆☆☆☆ | This is the perfect Universal Remote.<br>by gregsenter new , Oct 13 '05<br>Pros: Ease of use. Ergonomics. Rechargeable. Color Display.<br>Cons: Bottom two rows of numbers requires my second hand. Price, but worth every penny. |

16 of 16 people found the following review helpful:

☆☆☆☆ Has my search for the perfect remote finally ended?
July 16, 2005
Reviewer: azog - See all my reviews I'm not entirely sure this would be the end-all-be-all of remotes, but it sure comes close. I suspect if I spent $1,000 or more on a Pronto, I'd be a little more decisive, but the Harmony is still an excellent middle-range remote.

Set up was quick and painless. The harmony knew about all my devices, so I didn't need to go thru the painful process of head-to-head training.

*FIG. 24B*

FROM FIG. 26A

Recent Users    More » busey    More »

Logitech
Epinions
Amazon
Best Buy

RELATED PAGES AREA

Has my search for the perfect remote finally ended?    amazon.com
Reviewer: azog - See all my reviews, July 16, 2005

I'm not entirely sure this would be the end-all-be-all of remotes, but it sure comes close. I suspect if I spent $1,000 or more on a Pronto, I'd be a little more decisive, but the Harmony is still an excellent middle-range remote.

Set up was quick and painless. The harmony knew about all my devices, so I didn't need to go thru the painful process of head-to-head training.

Bought one....
Posted by: busey on 11/2/2005  11:15 AM (0 Comments)
On Shadow Page: Logitech ...Harmony® Re....
But I haven't been using it. It was pretty effective at control the power and such on my assortment of devices, but it failed on the DVR front. Getting the DVR options was too difficult in TV mode and it made it hard to eliminate my Cable/DVR remote.

Prices from the Web pcmall.com    $219.99
All items from merchant -
Add to Shopping List

OnSale.com    $227.00
All items from merchant -
Add to Shopping List

MacMall    $228.00
All items from merchant -
Add to Shopping List

AGGREGATE PRICING

AGGREGATE REVIEWS AND DISCUSSIONS

METHOD, SYSTEM AND COMPUTER PROGRAM PRODUCT FOR CATALOGING CONTENT ON A GLOBAL COMPUTER NETWORK

CROSS-REFERENCE TO RELATED APPLICATIONS

This application is a continuation of PCT Application Serial No. PCT/US2006/023572, filed Jun. 16, 2006, by Andrew Thomas Busey, entitled METHOD, SYSTEM AND COMPUTER PROGRAM PRODUCT FOR CATALOGING A GLOBAL COMPUTER NETWORK, which: (a) is assigned to the assignee of this application; (b) is incorporated herein by reference in its entirety; and (c) claims priority to U.S. Provisional Patent Application Ser. No. 60/691,183, filed Jun. 16, 2005, by Andrew Thomas Busey, entitled METHOD, SYSTEM, AND COMPUTER PROGRAM PRODUCT FOR CATALOGING A GLOBAL COMPUTER NETWORK, which is assigned to the assignee of this application, and which is incorporated herein by reference in its entirety.

BACKGROUND

The present disclosure relates in general to information handling systems, and in particular to a method, system and computer program product for cataloging a global computer network. A Transport Control Protocol/Internet Protocol ("TCP/IP") network, such as the internet, is an example of a global computer network. A user may prefer to catalog various content of the global computer network. Such cataloging allows the user to navigate the global computer network in a more efficient manner.

SUMMARY

On a display device, within at least one web browser window, an information handling system displays a first web page that is associated with an address of a second web page. The first web page includes commentary about the second web page by one or more human reviewers. The first web page is so displayed on the display device in response to a selection by a user of at least one of the following: a command that is displayed on the display device within a web browser toolbar, in association with the second web page; and a hyperlink that is displayed on the display device within a third web page, in association with the second web page.

BRIEF DESCRIPTION OF THE DRAWING

FIG. 3e is an illustration of a screen displayed by the display device of the representative client of FIG. 2.

FIG. 5b is an illustration of a screen displayed by the display device of the representative client of FIG. 2.

FIG. 8b is an illustration of a screen displayed by the display device of the representative client of FIG. 2.

FIG. 8c is an illustration of a screen displayed by the display device of the representative client of FIG. 2.

FIG. 10 is a notated illustration of a region of the screen of FIG. 8a.

FIG. 14 is an illustration of a screen displayed by the display device of the representative client of FIG. 2.

FIG. 15a is an illustration of a screen displayed by the display device of the representative client of FIG. 2.

FIG. 17a is an illustration of a screen displayed by the display device of the representative client of FIG. 2.

FIG. 17b is an illustration of a screen displayed by the display device of the representative client of FIG. 2.

FIG. 24 is an illustration of a screen displayed by the display device of the representative client of FIG. 2.

DETAILED DESCRIPTION

Figure 1:
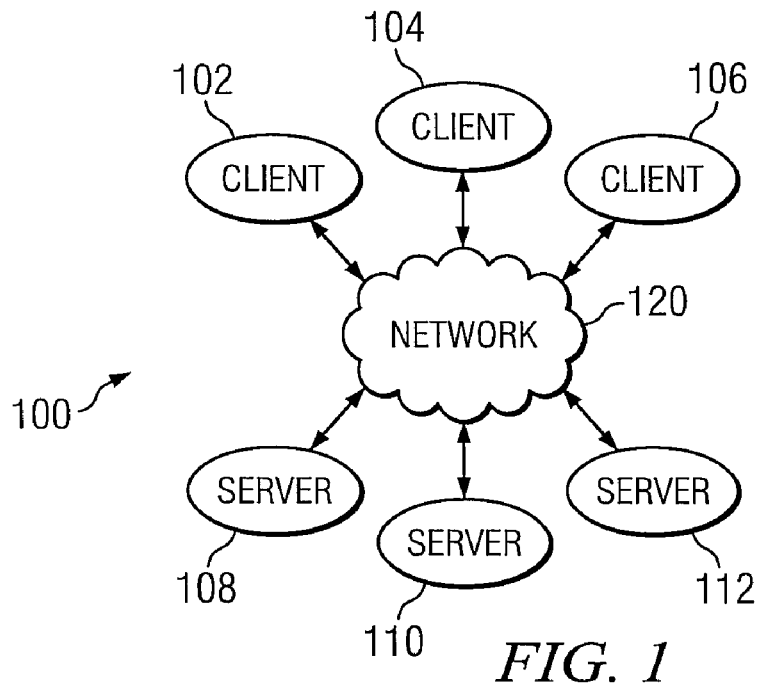
FIG. 1 is a block diagram of a system according to the illustrative embodiment.

FIG. 1 is a block diagram of a system, indicated generally at 100, according to the illustrative embodiment. The system 100 includes clients 102, 104 and 106, each for executing respective client processes as discussed further hereinbelow. Further, the system 100 includes (a) a global computer network 120, such as a Transport Control Protocol/Internet Protocol ("TCP/IP") network 120 (e.g., the internet or an intranet), and (b) servers 108, 110 and 112 for executing respective server processes as discussed further hereinbelow.

Each of the clients 102, 104 and 106, and the servers 108, 110 and 112, includes a respective network interface for communicating with the network 120 (i.e. outputting information to, and receiving information from, the network 120), such as by transferring information (e.g., instructions, data, signals) between such client (or server) and the network 120. Each of the clients 102, 104 and 106, the network 120, and the servers 108, 110 and 112 is a computer system that includes at least one respective computing device (e.g., computer) for executing a respective process and performing respective operations (e.g., processing and communicating information) in response thereto as discussed further hereinbelow. Each such computer system and computing device is formed by various electronic circuitry components.

Also, as shown in FIG. 1, the servers 108, 110 and 112 are coupled through the network 120 to one another, and to the clients 102, 104 and 106. Through the network 120, information is communicated by the servers 108, 110 and 112, and by the clients 102, 104 and 106, to one another. In the discussion hereinbelow: (a) the client 102 is a representative one of clients 102, 104 and 106; and (b) the server 108 is a representative one of the servers 108, 110 and 112. Although FIG. 1 shows only three clients (i.e., clients 102, 104 and 106), other clients (substantially identical to the clients 102, 104 and 106) are connectable to network 120. Similarly, although FIG. 1 shows only three servers (i.e., servers 108, 110 and 112), other servers (substantially identical to the servers 108, 110 and 112) are connectable to the network 120.

Figure 2:
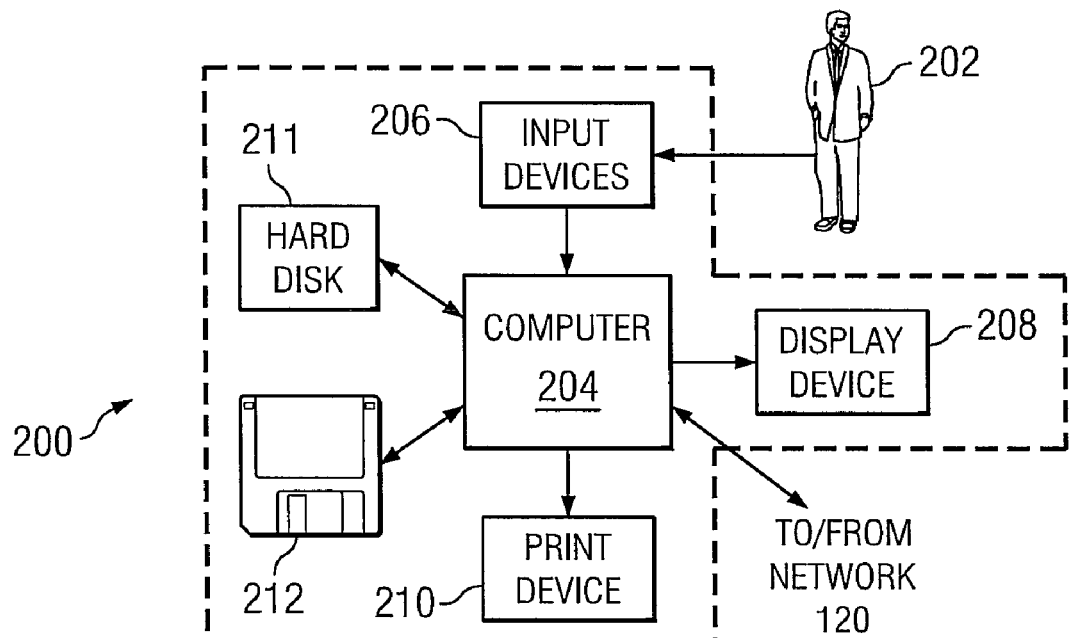
FIG. 2 is a block diagram of a representative client of the system of FIG. 1.

FIG. 2 is a block diagram of a representative one of the computer systems (e.g., client 102) of the system 100.

Such representative computer system is indicated by a dashed enclosure 200. Each of the computer systems of FIG. 1 operates in association with a respective human user. Accordingly, in the example of FIG. 2, the computer system 200 operates in association with a human user 202, as discussed further hereinbelow.

As shown in FIG. 2, the computer system 200 includes (a) input devices 206 for receiving information from the user 202, (b) a display device 208 (e.g., a conventional electronic cathode ray tube ("CRT") device) for displaying information to the user 202, (c) a computer 204 for executing and otherwise processing instructions, (d) a print device 210 (e.g., a conventional electronic printer or plotter) for printing visual images on paper, (e) a nonvolatile storage device 211 (e.g., a hard disk drive or other computer-readable medium (or apparatus), as discussed further hereinbelow) for storing information, (f) a computer-readable medium (or apparatus) 212 (e.g., CD-ROM) for storing information, and (g) various other electronic circuitry for performing other operations of the computer system 200.

For example, the computer 204 includes (a) a network interface (e.g., circuitry) for communicating between the computer 204 and the network 120 and (b) a memory device (e.g., random access memory ("RAM") device and read only memory ("ROM") device) for storing information (e.g., instructions executed by the computer 204 and data processed by the computer 204 in response to such instructions). Accordingly, the computer 204 is connected to the network 112, the input devices 206, the display device 208, the print device 210, the storage device 211, and the computer-readable medium 212, as shown in FIG. 2.

In response to signals from the computer 204, the display device 208 displays visual images, and the user 202 views such visual images. Moreover, the user 202 operates the input devices 206, in order to output information to the computer 204, and the computer 204 receives such information from the input devices 206. Also, in response to signals from the computer 204, the print device 210 prints visual images on paper, and the user 202 views such visual images.

The input devices 206 include, for example, a conventional electronic keyboard or keypad and a pointing device, such as a conventional electronic "mouse," rollerball, or light pen. The user 202 operates the keyboard or keypad, in order to output alphanumeric text information to the computer 204, which receives such alphanumeric text information. The user 202 operates the pointing device, in order to output cursor-control information to the computer 204, and the computer 204 receives such cursor-control information. The input devices 206 also include, for example, touch-sensitive circuitry of a liquid crystal display ("LCD") device.

The system 200 is operable to receive, store (e.g., in a computer-readable medium) and display web pages from internet sites ("websites"). For example, as discussed further hereinbelow in connection with FIGS. 3a-8d and 10-19, the computer 204 executes a program for displaying the web pages in response to information received from the user 202.

Figure 3A:
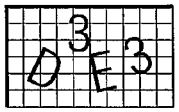
FIG. 3a is an illustration of a screen displayed by a display device of the representative client of FIG. 2.
Figure 3B:
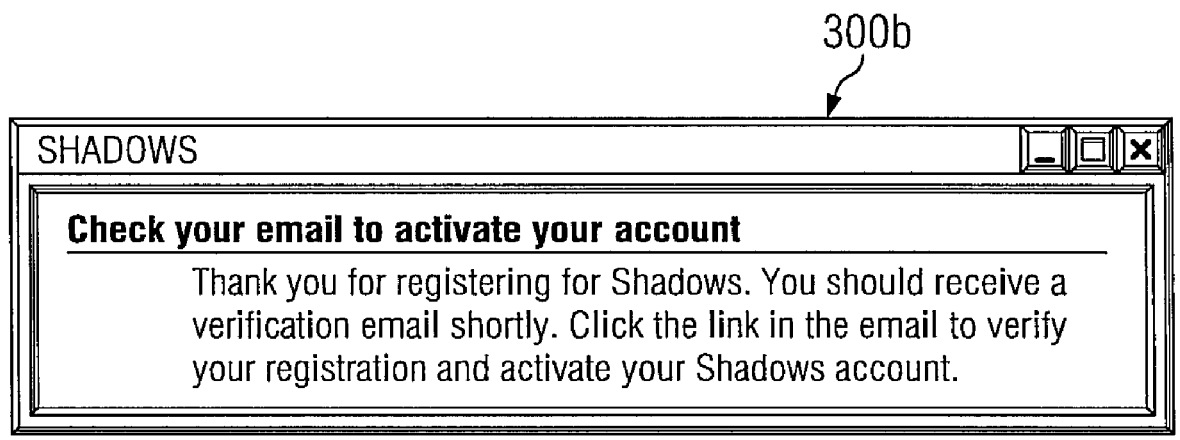
FIG. 3b is an illustration of a screen displayed by the display device of the representative client of FIG. 2.

FIG. 3a is an illustration of a visual image (or "screen"), indicated generally at 300a, displayed by a display device (such as the display device 208) of a user (such as the user 202) of the system 100. In the discussion hereinbelow, the representative user's login name is "shadowsuser," except as noted otherwise. Likewise, FIGS. 3b-8d and 10-19 are illustrations of other screens displayed by the display device. In the course of performing operations that are discussed further hereinbelow in connection with FIGS. 3b-8d and 10-19, a server (such as the server 108): (a) writes information for storage in a database of its computer-readable medium; (b) reads information that has been previously stored in such database; and (c) outputs signals to the user's computer (such as the computer 204) through the network 120, resulting in display of such other screens by the display device.

The user's computer executes web browser software, such as Microsoft Internet Explorer software. In response to such execution, the user's display device displays the various screens within a web browser window. For clarity, FIG. 3a does not show the web browser window and its Uniform Resource Locator ("URL") field, which is a region of the web browser window in which the user is able to specify a URL address.

The user specifies the URL address by operating the input devices 206 to select the URL field and then specify alphanumeric character information of the URL address for display within the URL field. For example, the user specifies such information by operating the input devices 206 (e.g., electronic keyboard), so that the display device displays such information within the URL field. Such specification (of information) by the user is hereinafter referred to as the user "entering" or "typing" such information. In the example of FIGS. 3a-3e, the user-specified URL address is http://www.pluck.com, which specifies the route to a file on the server 108 (which is a global computer network facility).

After the user specifies the URL address, the user is able to cause the computer to output (or "transmit" or "send") the user-specified URL address through the network 120 to the server 108, as for example by pressing an "Enter" key of the electronic keyboard. In response to such transmission of the user-specified URL address, the network 120 communicates with the server 108 (e.g., through various network routers). The server 108 detects such communication (e.g., a request for the screen 300a of FIG. 3a).

In response thereto, the server 108 outputs one or more signals (such as HyperText Markup Language ("HTML")

instructions or EXtensible Markup Language ("XML") instructions) through the network 120 to the user's computer. The user's computer receives such signals from the server 108. In response thereto, the user's computer outputs one or more signals to the display device, so that the display device displays a screen (e.g., web page from the user-specified URL address) as instructed.

The server 108 (in response to its programmed instructions and data) is capable of automatically redirecting the user-specified URL address from http://www.pluck.com to a different URL address (e.g., a subdomain or subdirectory web page of http://www.pluck.com). In performing such redirection, the server 108 outputs one or more signals through the network 120 to the user's computer. The user's computer receives such signals from the server 108. In response thereto, the user's computer outputs one or more signals to the display device, so that the display device displays: (a) a screen (e.g., web page from the different URL address) as instructed; and (b) the different URL address within the URL field of the web browser window.

As shown in FIG. 3a, the screen 300a includes a set of information fields and a set of hyperlinks (or "buttons"), which are regions of the screen 300a. A field or hyperlink of the screen 300a is individually selectable (or "clickable") by the user, such as by the user's: (a) operation of the input devices 206 (e.g., pointing device) to position a cursor for overlapping with the field or hyperlink; and (b) after so positioning the cursor, activating a switch of the input devices 206 (e.g., a switch of the pointing device). Such selection (of a field or hyperlink) by the user is hereinafter referred to as the user "clicking" such field or hyperlink.

In the example of FIG. 3a, the user enters information in various fields of a region 302, optionally enters information in various fields of a region 304, and selects an option (by clicking a radio button) in a region 306. After the user enters such information and makes such selection, the user clicks a "Submit" button in the region 306, which causes the user's computer 204 (hereinafter referred to simply as "computer") to output such information and selection through the network 120 to the server 108 (hereinafter referred to simply as "server"). In response to such transmission, the server: (a) prepares to establish a "shadows" account for such user, according to such information and selection, which the server writes for storage in a database of its computer-readable medium; (b) outputs additional signals through the network 120 to the user's computer, resulting in display of a screen 300b (FIG. 3b) by the display device 208 (hereinafter referred to simply as "display device"); and (c) sends an account confirmation e-mail message to the user's e-mail address (as specified by the user in the "Email address:" field of the region 302).

Figure 3C:
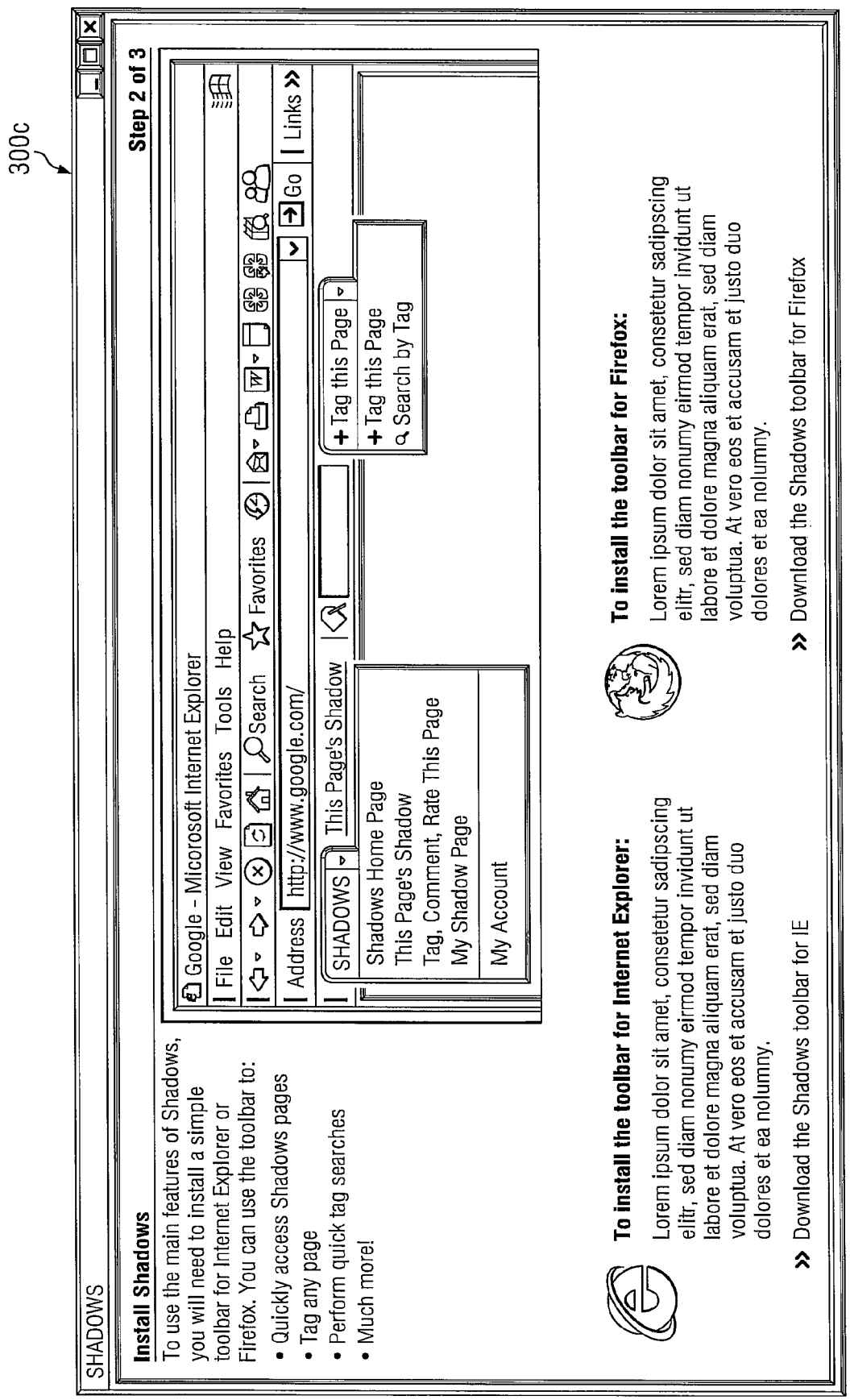
FIG. 3c is an illustration of a screen displayed by the display device of the representative client of FIG. 2.
Figure 3D:
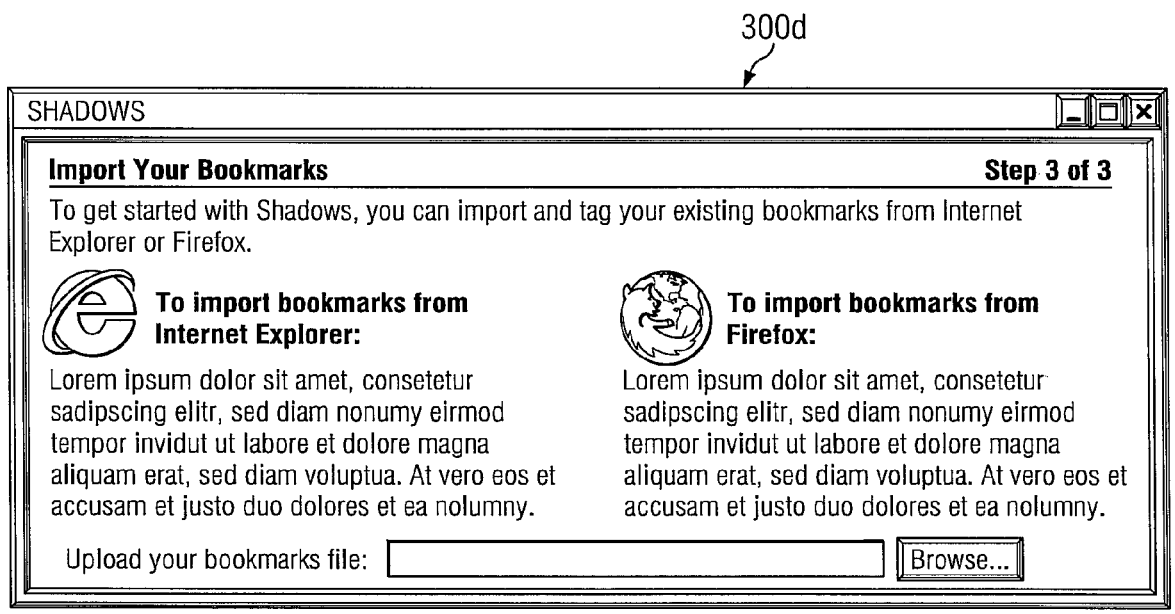
FIG. 3d is an illustration of a screen displayed by the display device of the representative client of FIG. 2.

In response to the user clicking a hyperlink in the confirmation e-mail message and following a series of steps as shown in FIGS. 3c-3e (which illustrate screens 300c, 300d and 300e, respectively), the server: (a) establishes the "shadows" account for the user; and (b) communicates with the user's computer to install browser plug-in software on the user's computer. After such installation, the user's computer executes the plug-in software with the web browser software, so that the web browser window includes a "shadows" toolbar as shown in FIG. 4.

As shown in screen 300e of FIG. 3e, as part of such installation of the plug-in software, the user's computer has identified the user's list of network address bookmarks (or "favorites"), which the user's computer has read from a computer-readable medium in response to the user specifying a file location at a screen 300d of FIG. 3d. The user's computer has output one or more signals to the display device, so that the display device displays hyperlinks for such bookmarks in the screen 300e. In the screen 300e, the user has an opportunity to specify (or "assign") tags for association with such bookmarks (e.g., by the user typing such tags). For example, one of the user's bookmarks is a hyperlink 308, which points to a web page for CNN INTERNATIONAL. In a field 310, the user enters "News" as a tag for association with such web page. After the user enters such tag, the user clicks a "Submit" in the screen 300e, which causes the computer to output such tag (and a network address for such web page) through the network 120 to the server. In response to such transmission, the server: (a) writes such tag for storage in a database of its computer-readable medium, so that such tag is associated with the user's "shadows" account and such web page; and (b) accordingly, later displays the "News" tag in a region 604 of FIG. 6 (discussed further hereinbelow).

In completing the account setup and software installation, as discussed hereinabove in connection with FIGS. 3a-e, the user's computer integrates the "shadows" toolbar for operation with MICROSOFT INTERNET EXPLORER web browser software. As shown in a screen 400 of FIG. 4, the user's computer outputs the "shadows" toolbar" for display on the display device as part of a web browser window in the screen 400.

Figure 4:
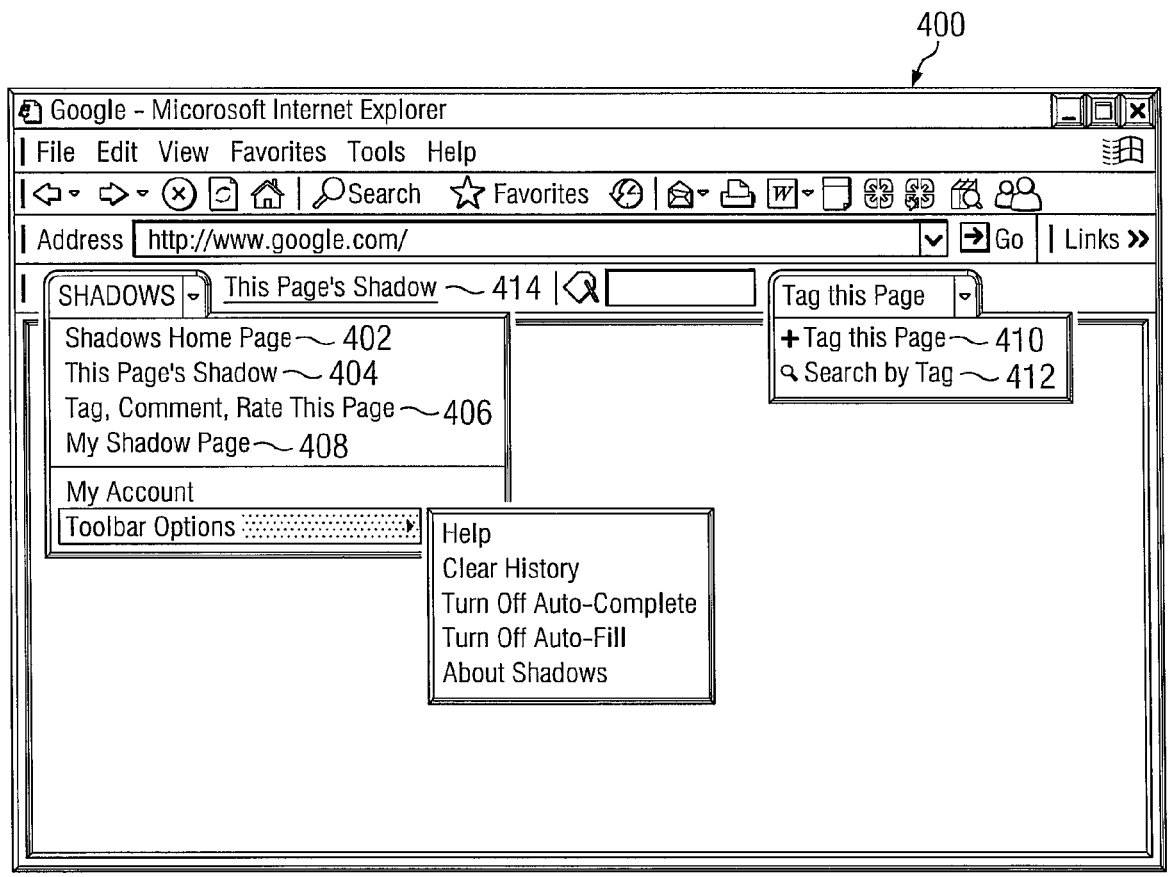
FIG. 4 is an illustration of a screen displayed by the display device of the representative client of FIG. 2.

In response to the user clicking a "Shadows Home Page" button 402 in the "shadows" toolbar of FIG. 4, the server outputs additional signals to the user's computer, resulting in display of a screen 700 (FIG. 7) by the display device.

In response to the user clicking a "This Page's Shadow" command button 404 or 414 in the "shadows" toolbar of FIG. 4 the server outputs additional signals to the user's computer, resulting in display of either: (a) a screen 1100 (FIG. 11) by the display device, as discussed further hereinbelow, if a registered user has already entered a comment about such web page; or (b) a screen 1700a (FIG. 17a) by the display device, as discussed further hereinbelow, if no registered user has yet entered a comment about such web page, yet such web page is a subdomain or subdirectory web page of the web domain whose "shadow" page is displayed in the screen 1700a. Such buttons 404 and 414 are displayed in the web browser window of the screen 400 in association with the web page that is displayed in the screen 400.

In response to the user clicking a "Tag, Comment, Rate This Page" button 406 in the "shadows" toolbar of FIG. 4, the server outputs additional signals to the user's computer, resulting in display of a screen 1300 (FIG. 13) by the display device.

In response to the user clicking a "My Shadow Page" button 408 in the "shadows" toolbar of FIG. 4, the server outputs additional signals to the user's computer, resulting in display of a screen 500a (FIG. 5a) or a screen 500b (FIG. 5b) by the display device.

In response to the user clicking a "Tag this Page" button 410 in the "shadows" toolbar of FIG. 4, the server outputs additional signals to the user's computer, resulting in display of a screen (such as screen 1300 of FIG. 13) by the display device.

In response to the user clicking a "Search by Tag" button 412 in the "shadows" toolbar of FIG. 4, the server outputs additional signals to the user's computer, resulting in display of a screen 700 (FIG. 7) by the display device.

Figure 5A:
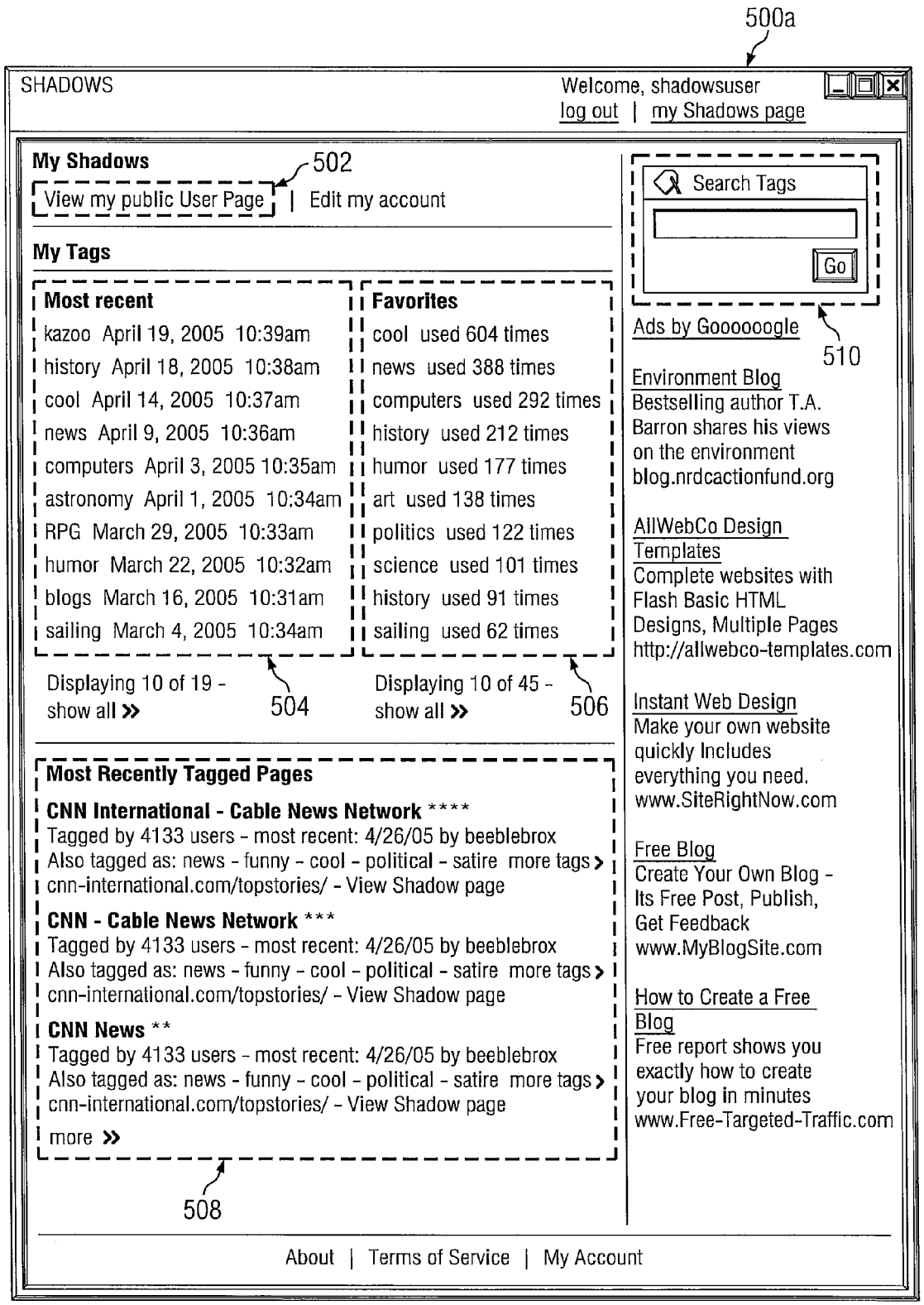
FIG. 5a is an illustration of a screen displayed by the display device of the representative client of FIG. 2.

FIG. 5a is an illustration of a representative "My Shadows Page" screen. In response to the user establishing an account (as discussed further hereinabove in connection with FIGS. 3a-e), the server creates a "My Shadows Page" screen that is password protected and contains information that is private to the user. The server outputs additional signals to the user's computer, resulting in display of the user's "My Shadows Page" screen by the display device, if the user is logged into the user's account. The server creates a separate "My Shadow's Page" for any user (e.g., the user 202 or any other user of the system 100) who establishes a "shadows" account ("registered user" or "human reviewer"), as discussed further hereinabove in connection with FIGS. 3a-3e.

FIG. 5a and FIG. 5b show alternative versions of the "My Shadows Page." By executing the "Shadows Tool Bar" plug-in software, the user's computer suitably communicates with the server to customize "look and feel" features of the user's "My Shadows Page" screen, according to user-selected preferences. Examples of such features are: page locations; presence or absence of "shadows" software features (e.g., "My Comment"); and feeds from other web pages, such as stock quotes or weather.

In FIG. 5a, a screen 500a includes:
(a) in a region 502, a link to a screen 600 in FIG. 6;
(b) in a region 504, a list of the user's most recently assigned tags;
(c) in a region 506, a list of the user's most frequently specified tags (e.g., as specified in various search queries);
(d) in a region 508, a list of the user's most recently tagged web pages, with associated summary information; and
(e) a field 510, in which the user is able to specify a query for searching the server's database of tags that have been assigned by the various registered users of the system 100.

In FIG. 5b, a screen 500b includes a list of the user's most frequently specified tags. Such list is displayed in the form of a respective tab per tag. Advantageously, the tab (having an associated tag) also displays a list of web pages to which the associated tag has been assigned by the user.

Figure 6A:
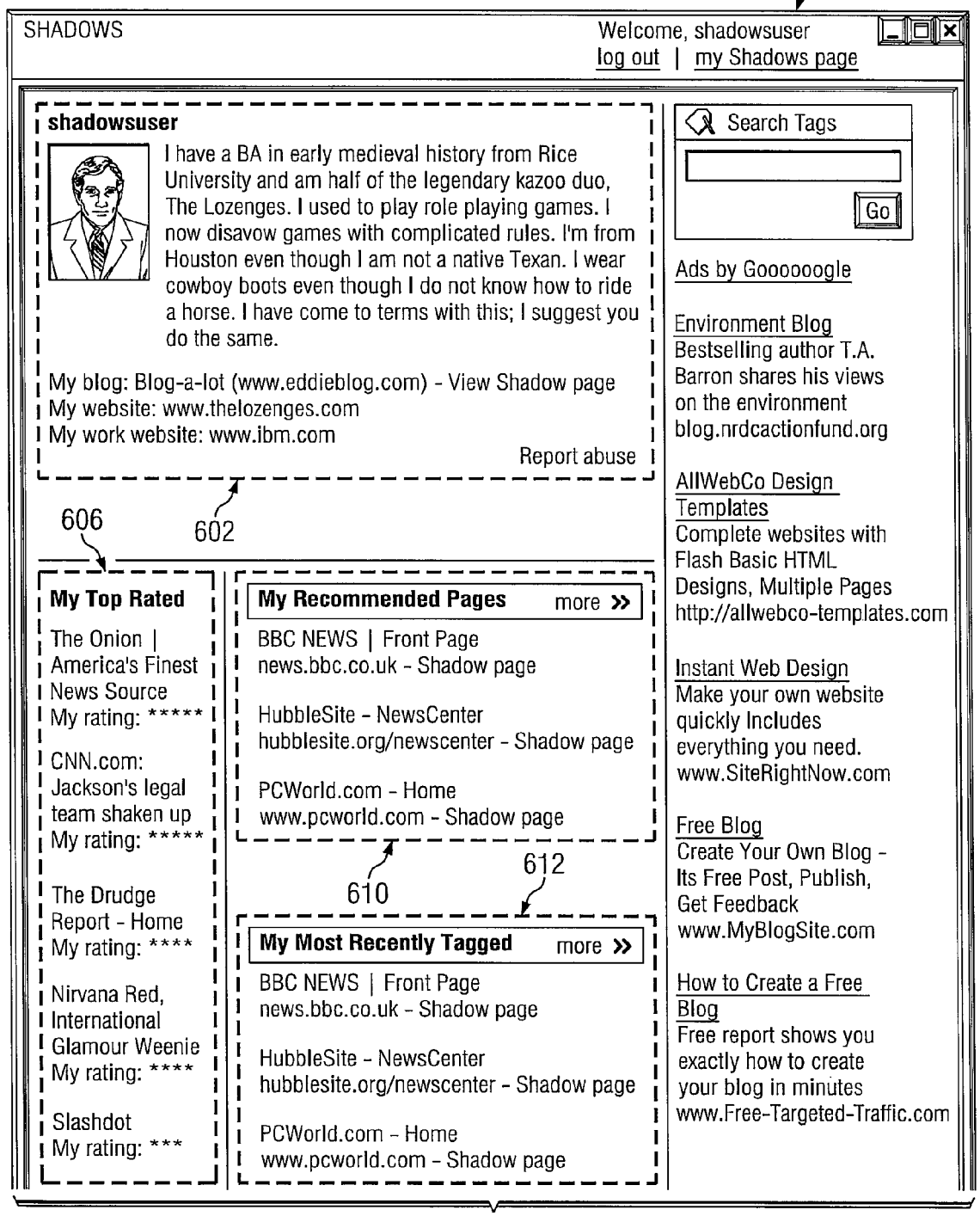
FIG. 6 is an illustration of a screen displayed by the display device of the representative client of FIG. 2.
Figure 6B:
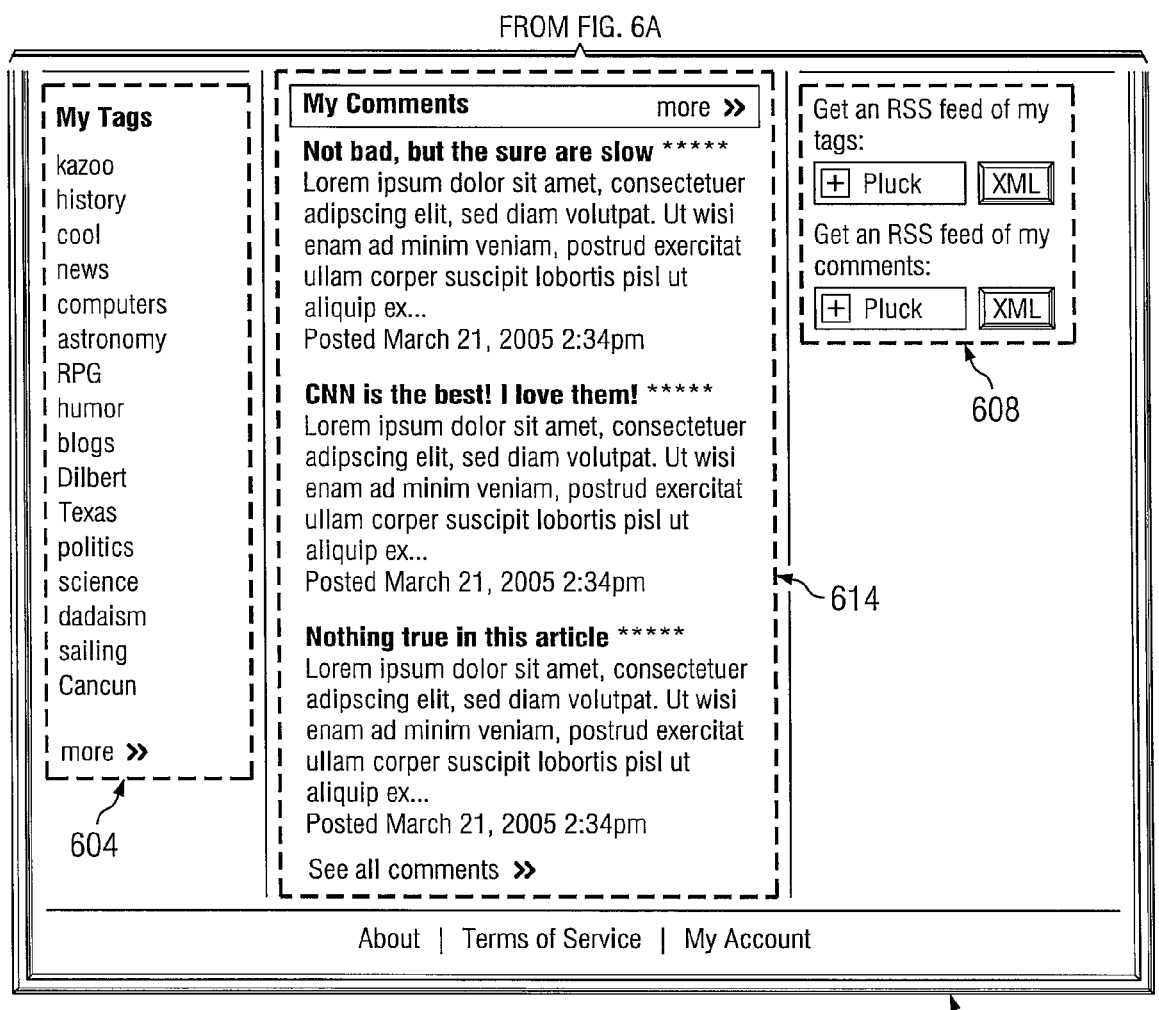

FIG. 6 is an illustration of a user's "Public Page" screen 600, which is viewable by another user ("viewing user") of the system 100. For example, in response to the viewing user clicking a "shadowsuser" button in a region 708 (FIG. 7), the server outputs additional signals to the viewing user's computer, resulting in display of the "shadowsuser" user's "Public Page" screen by the display device (which is the "Public Page" screen of the user whose login name is "shadowsuser"). Similarly, in response to the viewing user clicking a "beeblebrox" button 712 (FIG. 7), the server outputs additional signals to the viewing user's computer, resulting in display of the "beeblebrox" user's "Public Page" screen by the display device (which is the "Public Page" screen of a different user whose login name is "beeblebrox").

With regard to the user whose "Public Page" screen is being displayed by the display device ("displayed user"), such user's information was entered by such user in screen 300a of FIG. 3 (e.g., "User Name," "About me," "My photo," "My website," "My work website," "My favorite other website"). Accordingly, such information is displayed in a region 602 of such user's "Public Page" screen. Also, a region 604 (FIG. 6) includes a list of tags that such user has assigned to various web pages.

Further, a region 606 (FIG. 6) includes a list of web pages that such user has rated most highly. When such user has assigned the same highest rating to more than five sites, the server executes a "most highly rated algorithm" for determining which sites to display in such user's "Public Page" screen. A screen 1300 (FIG. 13) shows how such user is capable of assigning a rating to a particular web page (e.g., http://www.cnn.com/2005/US/Careers/04/15/spring.cleaning/index.html). The server writes such user's various assigned ratings for storage in a database of the server's computer-readable medium, in a manner that associates such ratings with such user.

In one embodiment, in response to such user's ratings of various web pages, the server pushes selected content (e.g., advertisements and promotional offers) to such user by outputting such content through the network 120 to the user's computer system for display on its display device, so that such content is viewable by such user. In such embodiment, the server executes software that includes programming for selecting such content, according to potential interest by such user (as determined in response to such user's ratings of various web pages), and according to fees paid to an operator of the server by sponsors of such content.

In response to the viewing user clicking a suitable button in a region 608 (FIG. 6), the server outputs a Really Simple Syndication ("RSS") feed to the viewing user's computer from the user-selected source (e.g., from a list of tags that the displayed user has assigned to various web pages, or from a list of comments that the displayed user has assigned to various web pages).

In a region 610, the screen 600 displays a list of web pages that the displayed user has recommended to other users.

In a region 612, the screen 600 displays a list of web pages that the displayed user has most recently tagged. However, if the displayed user clicked the "No" radio button in the region 306 (FIG. 3a), then the server withholds such information from the region 612, so that such information is unavailable for viewing by other users.

In a region 614, the screen 600 displays a list of comments and ratings that the displayed user has assigned to various web pages.

Figure 7:
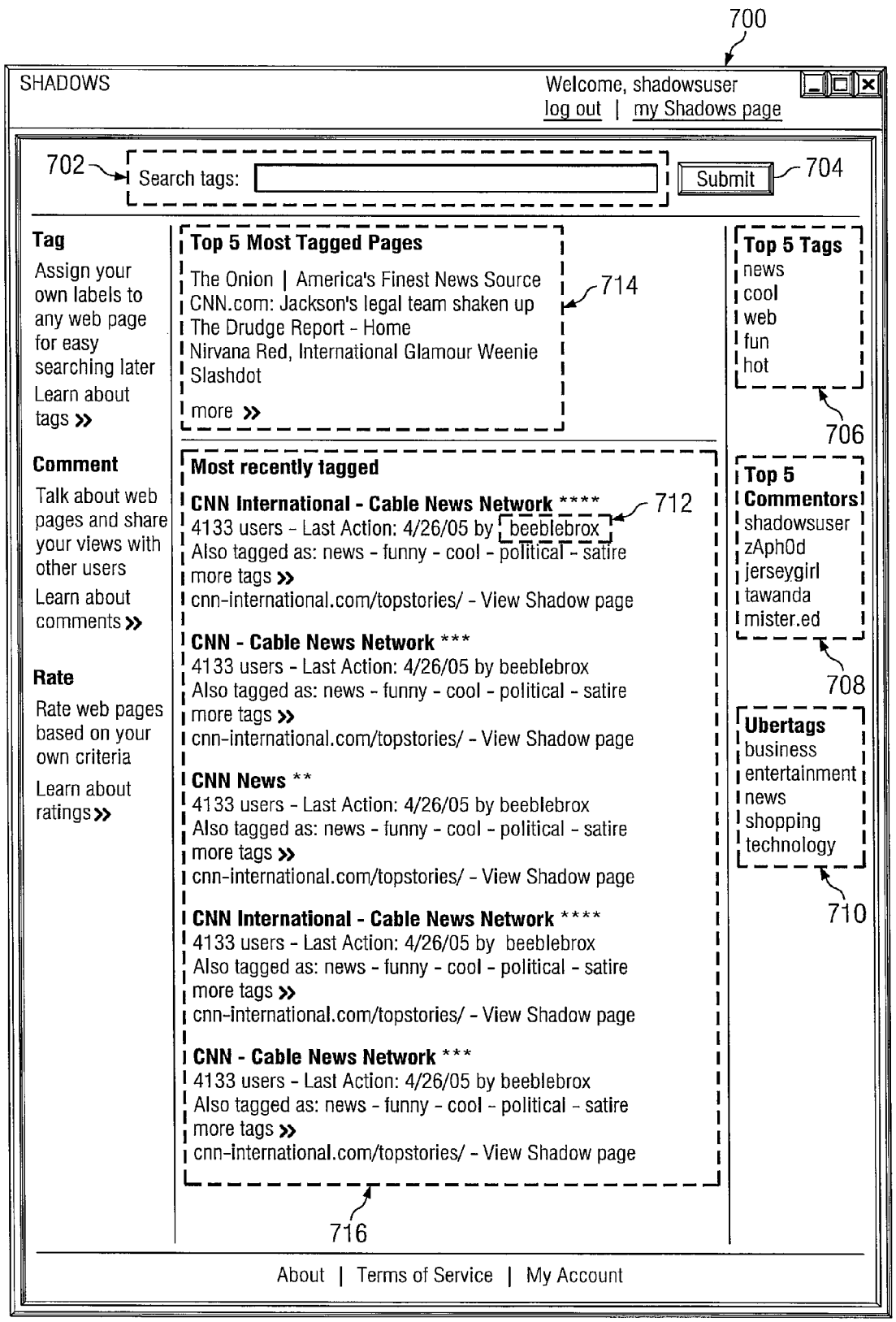
FIG. 7 is an illustration of a screen displayed by the display device of the representative client of FIG. 2.

FIG. 7 is an illustration of a "Search Page" screen 700. For example, in response to the user clicking a "Search by Tag" button 412 (FIG. 4), the server outputs additional signals to the user's computer, resulting in display of the screen 700 by the display device. By specifying information in a field 702 and clicking a "Submit" button 704, the user is able to search the server's catalog of tags that have been assigned to web pages by registered users of the system 100.

For example, in response to the user entering the text "news" in the field 702 and clicking the "Submit" button 704, the server outputs additional signals to the user's computer, resulting in display of a "Search Results" screen by the display device. Screens 800a-800d of FIGS. 8a-8d, respectively, are examples of "Search Results" screens.

In the screen 700: (a) a region 706 displays a list of five tags that have been entered most frequently by the aggregate community of registered users; (b) a region 708 displays a list of five users that have entered the most tags and comments; and (c) a region 710 displays a list of administrator-specified terms that are referred to as "ubertags." By viewing such information, a user receives valuable guidance on candidate tags to consider specifying in a search query, which the user is able to specify by either: (a) typing the user-selected tag(s) in the field 702; or (b) clicking on a tag's hyperlinked name as displayed in the regions 706 and 710. For example, in response to the user clicking a "news" ubertag in the region 710, the server outputs additional signals to the user's computer, resulting in display of a screen 1600 of FIG. 16 (discussed further hereinbelow).

In a region 714, the screen 700 displays a list of web pages that have been most frequently tagged by the community of registered users.

In a region 716, the screen 700 displays a list of web pages that have been most recently tagged by the community of registered users.

Screens 800a-800d of FIGS. 8a-8d, respectively, are examples of "Search Results" screens. In response to the user's entry of the text "news" in the field 702 (FIG. 7), the server outputs signals to the user's computer, resulting in display of the screen 800a. In relation to the example of the screen 800a, the user: (a) has already established an account with the server; and (b) is logged into his or her account.

The screen 800a includes a "Find in Google" button 802. In response to the user clicking the button 802, the user's computer outputs signals through the network 120 to cause a GOOGLE search for the term "news" throughout the internet. In response to the GOOGLE search, the user's computer subsequently displays the GOOGLE search results within the web browser window.

In a "Top Uses of this Tag" region 806 of the screen 800a, the user is able to view a list of registered users that have most frequently assigned the "news" tag to various web pages.

Figure 10:
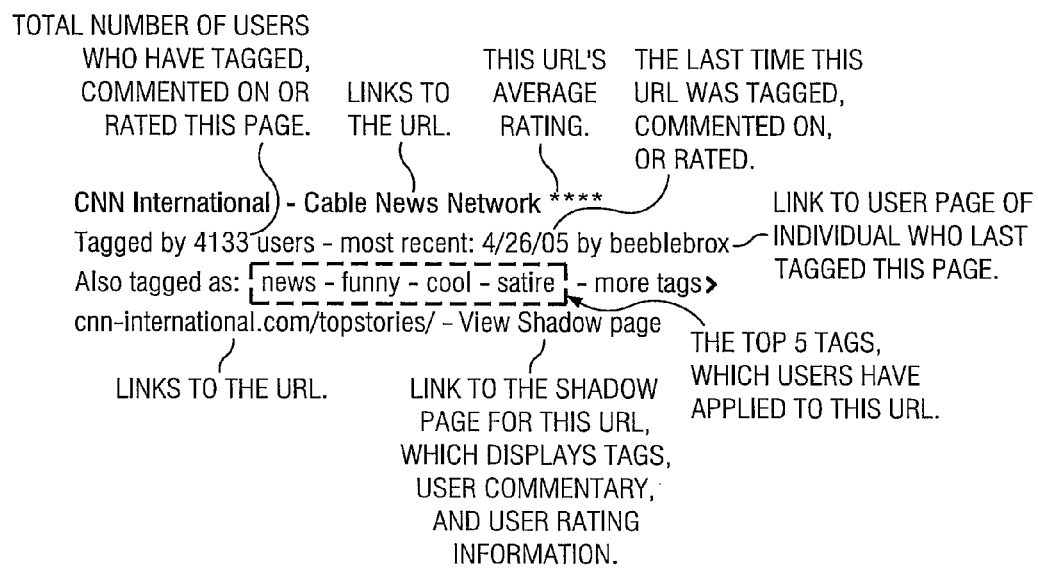

In a "My results" region 808 of the screen 800a, the user is able to view a list of web pages, to which the user has assigned the "news" tag. For example, the region 808 includes a region 812. FIG. 10 is a notated illustration of the region 812 (FIG. 8a), which is self-explanatory. As indicated in FIG. 10, the displayed links and tags are selectable (e.g., clickable) as hyperlinks by the user.

Figures 1, 8A:
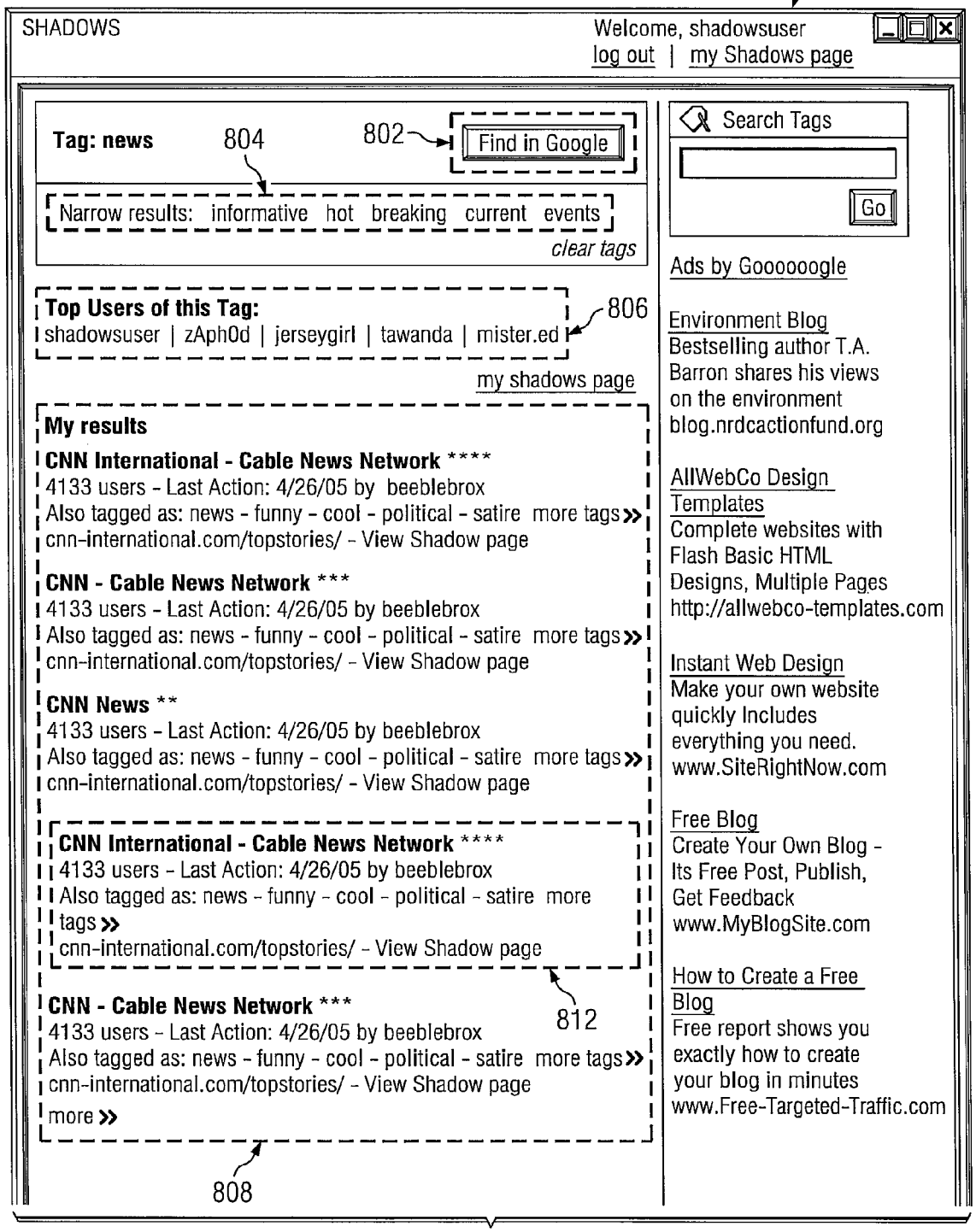
FIG. 8a is an illustration of a screen displayed by the display device of the representative client of FIG. 2.
Figure 9:
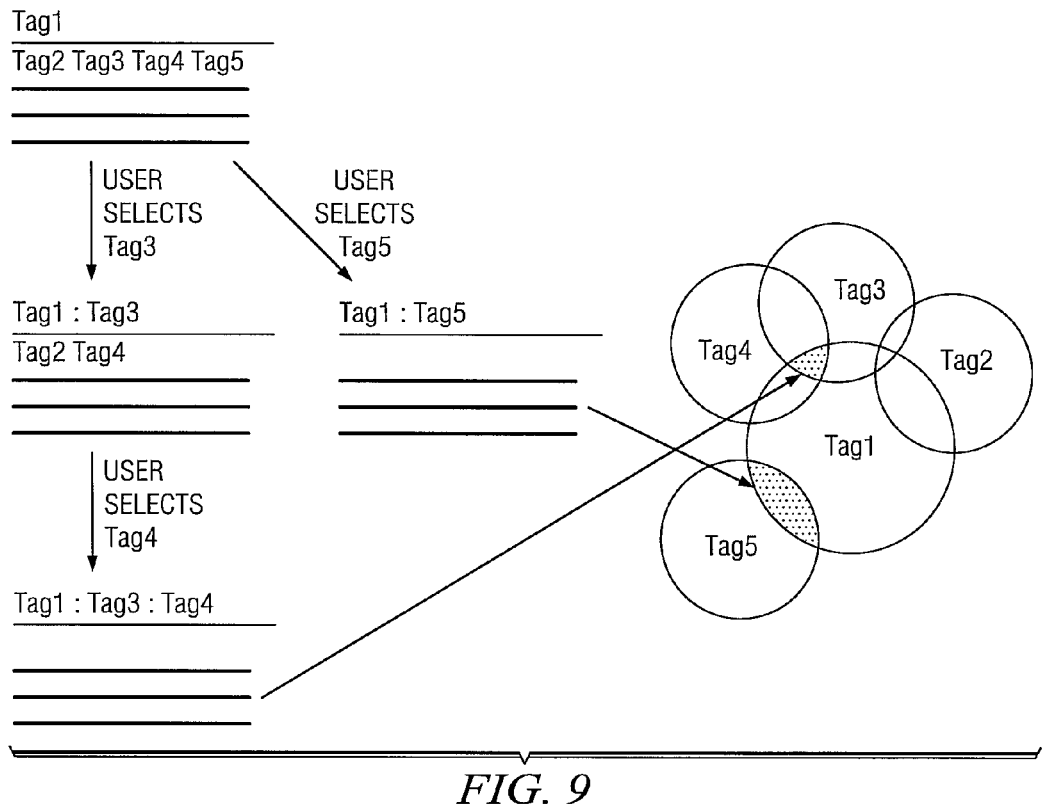
FIG. 9 is a conceptual illustration of a "narrow search" process executed by the representative client of FIG. 2

Similarly, in a "Community results" region 810 of the screen 800a, the user is able to view a list of web pages, to which any registered user has assigned the "news" tag. Moreover, in a region 804 of the screen 800a, the user is able to view a list of displayed tags that would narrow the user's search query, as further illustrated in FIG. 9. Referring simultaneously to FIGS. 8a and 9: (a) the "news" tag in FIG. 8a is an example of a Tag 1 in FIG. 9; and (b) the "informative," "hot," "breaking," "current," and "events" tags in FIG. 8a are examples of Tags 2, 3, 4 and 5 in FIG. 9. By viewing such information, a user receives valuable guidance on candidate tags to consider specifying in narrowing the user's search query.

For example, in the screen 800a (FIG. 8a), the user may select any of the displayed tags by clicking the user-selected tag within the region 804. In response to the user selecting a displayed tag within the region 804, the user's search query is narrowed. In response to the narrower search query, the server outputs signals to the user's computer, so that:

(a) regions 808 and 810 are revised to list (i) web page(s) to which both the "news" tag and the additional user-selected tag from the region 804 have been assigned (on a web page-by-web page basis) and (ii) web page(s) to which any one or more (even if less than all) of such tags have been so assigned; so that such list is displayed in a prioritized manner to more prominently (e.g., with larger font size) identify such listed web page(s) to which such tags have been most frequently assigned by the aggregate community of registered users; and (b) the region 804 is revised to list other tags that have been assigned to any one or more of such listed web page(s) by the aggregate community of registered users, even if such other tags have been so assigned to only one of such listed web page(s), so that such list (of such other tags) is displayed in a prioritized manner to more prominently (e.g., with larger font size) identify such other tags that have been most frequently assigned (to such listed web page(s)) by the aggregate community of registered users.

Further, the user may select any of such other tags by clicking the user-selected tag within the region 804. In response to the user selecting any of such other tags within the region 804, the user's search query is further narrowed. In response to the narrower search query, the server outputs signals to the user's computer, so that regions 804, 808 and 810 are further revised, as discussed in the immediately preceding paragraph.

Accordingly, by viewing the list in the region 804, the user receives valuable guidance on additional candidate tags to consider specifying in the search query. In relation to the example of the screen 800b of FIG. 8b, the user either: (a) has not already established an account with the server; or (b) is not logged into his or her account. Accordingly, in the "My results" region of FIG. 8b, the server asks the user to either: (a) create an account; or (b) log into his or her account. Nevertheless, in the "Community results" region of the screen 800b, the user is still able to view the list of web pages, to which any registered user has assigned the "news" tag.

In relation to the example of the screen 800c of FIG. 8c, the user has not assigned the "news" tag to any web page. Accordingly, in the "My results" region of FIG. 8c, the server informs the user of this fact by stating: "You have not tagged any items with 'news.'"

Figure 8D:
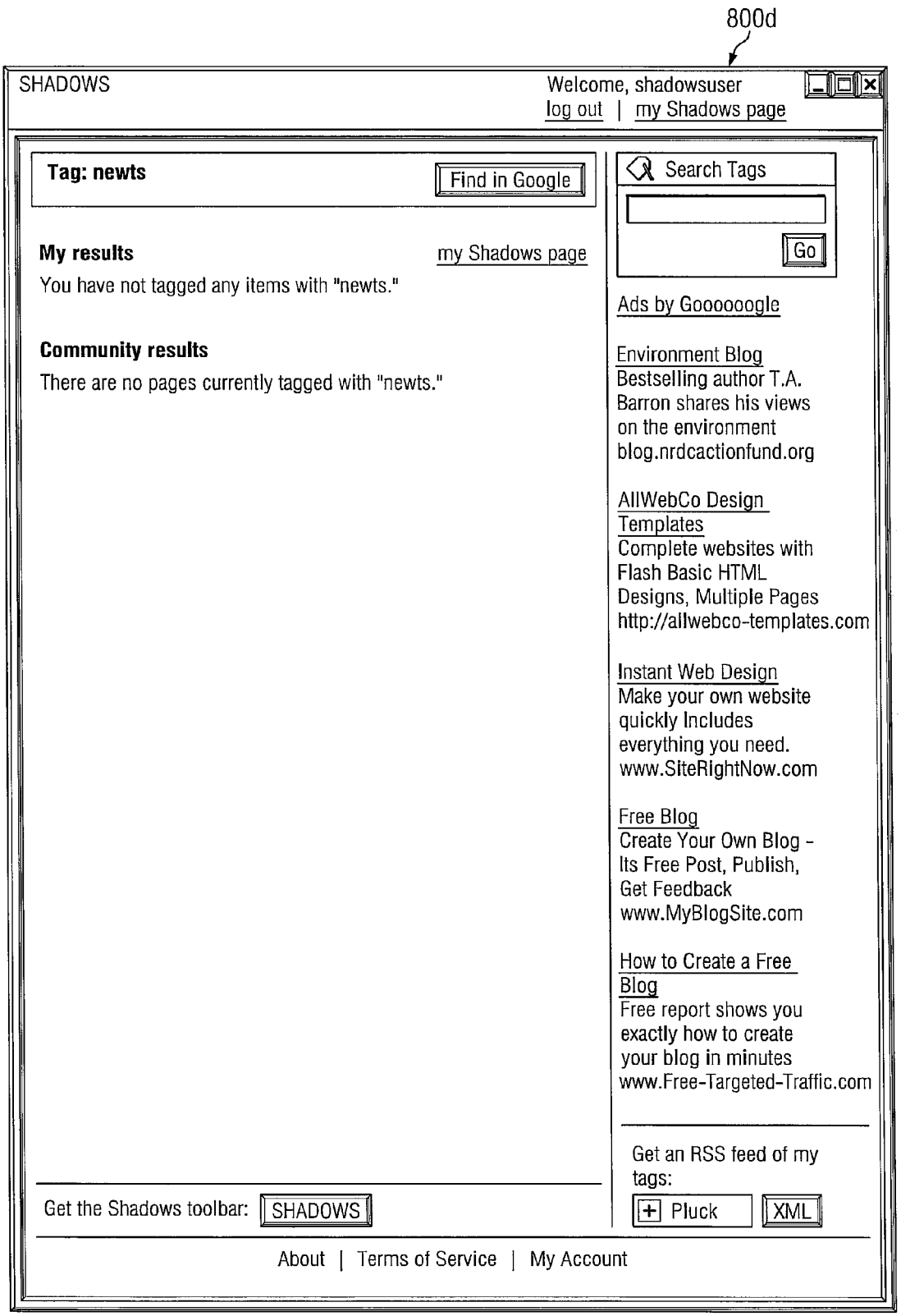
FIG. 8d is an illustration of a screen displayed by the display device of the representative client of FIG. 2.

In response to the user's entry of the text "newts" in the field 702 (FIG. 7), the server outputs signals to the user's computer, resulting in display of the screen 800d of FIG. 8d. In relation to the example of the screen 800d: (a) the user has not assigned the "newts" tag to any web page; and (b) no other registered user has assigned the "newts" tag to any web page. Accordingly, in the "My results" region of FIG. 8d, the server informs the user of this fact by stating: "You have not tagged any items with 'newts.'" Similarly, in the "Community results" region of FIG. 8d, the server informs the user of this fact by stating: "There are no pages currently tagged with 'newts.'"

Figure 11A:
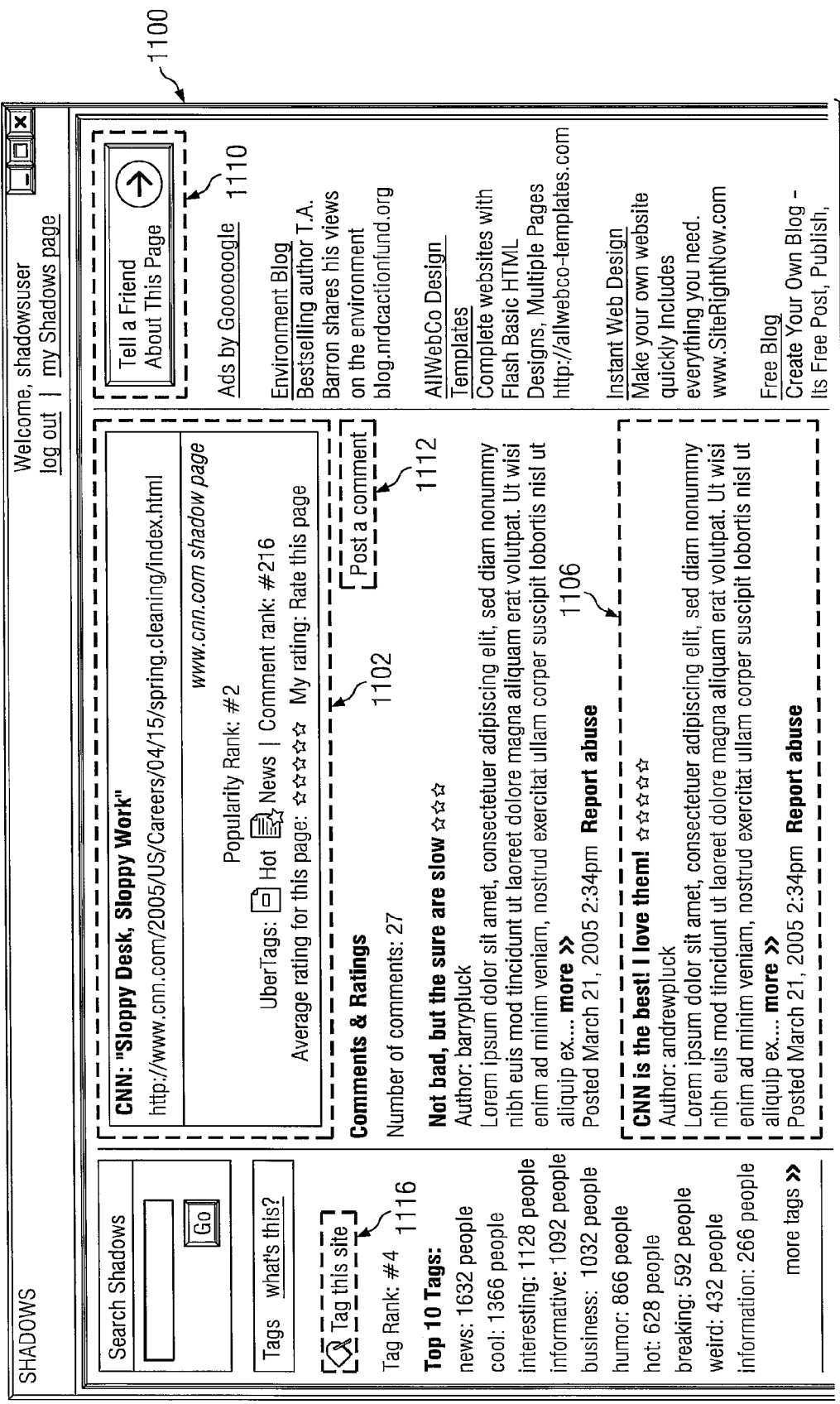
FIG. 11 is an illustration of a screen displayed by the display device of the representative client of FIG. 2.

FIG. 11 shows a "shadow" page for a web page http://www.cnn.com/2005/US/Careers/04/15/spring.cleaning/index.html. In response to the user clicking the "This Page's Shadow" command button 404 or 414 of FIG. 4, the server outputs additional signals to the user's computer, resulting in display of the screen 1100 (FIG. 11) by the display device, if a registered user has already entered a comment about the web page that is displayed in the screen 400. In one embodiment, if multiple URLs address the same web page, then the server: (a) associates such URL addresses with the same "shadow" page as one another, even if such URL addresses are otherwise different from one another; and (b) likewise, associates such "shadow" page with such URL addresses.

In a region 1102 of FIG. 11, the user is able to view summary rating and categorization information about the web page. Such information is assembled by the server in response to various commentary (e.g., comments, votes, ratings, tags) about the web page by the group of registered users of the system 100, and in response to other activities by the group of registered users of the system 100.

In the region 1102, the screen 1100 displays a result of the registered users' voting for ubertags in relation to the web page. The server assigns weights to such ubertag votes, so that newer votes are weighted more heavily than older votes. In the example of FIG. 11, the highest scoring ubertags (in relation to the web page) are "Hot" and "News." Also, by clicking one of the ubertags listed in a region 1104, the user is able to vote for such ubertag in relation to the web page.

Figure 13:
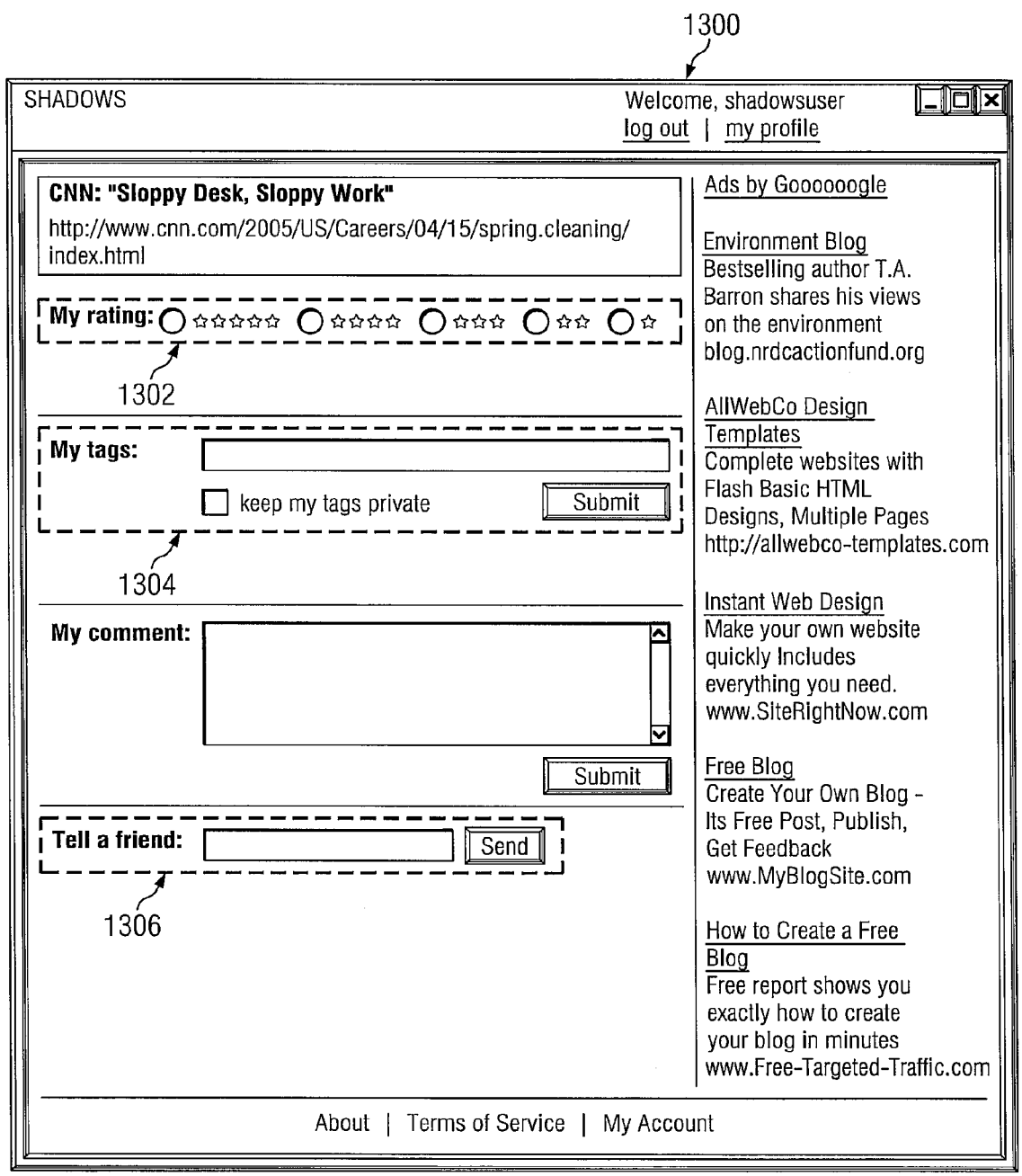
FIG. 13 is an illustration of a screen displayed by the display device of the representative client of FIG. 2.

The registered users are able to rate the web page by assigning a number of stars to the web page, as discussed further hereinbelow in connection with FIG. 13. The region 1102 displays such users' average rating of the web page. In the example of FIG. 11, the average user rating of the web page is five stars, as shown in the region 1102. In response to the user clicking a "Rate this page" hyperlink in the region 1102, the server outputs additional signals to the user's computer, resulting in display of a screen 1300 (FIG. 13), which is discussed further hereinbelow.

Further, the region 1102 includes a popularity rank of the web page. In the example of FIG. 11, the web page has a #2 popularity rank (as shown in the region 1102), such that the web page received the 2nd highest average user rating among the various web pages that have been tagged by one or more registered users.

Moreover, the region 1102 includes a comment rank of the web page. In the example of FIG. 11, the web page has a #216 comment rank (as displayed in the region 1102), such that the web page received the $216^{th}$ highest number of comments among the various web pages that have been tagged by one or more registered users.

Figure 12:
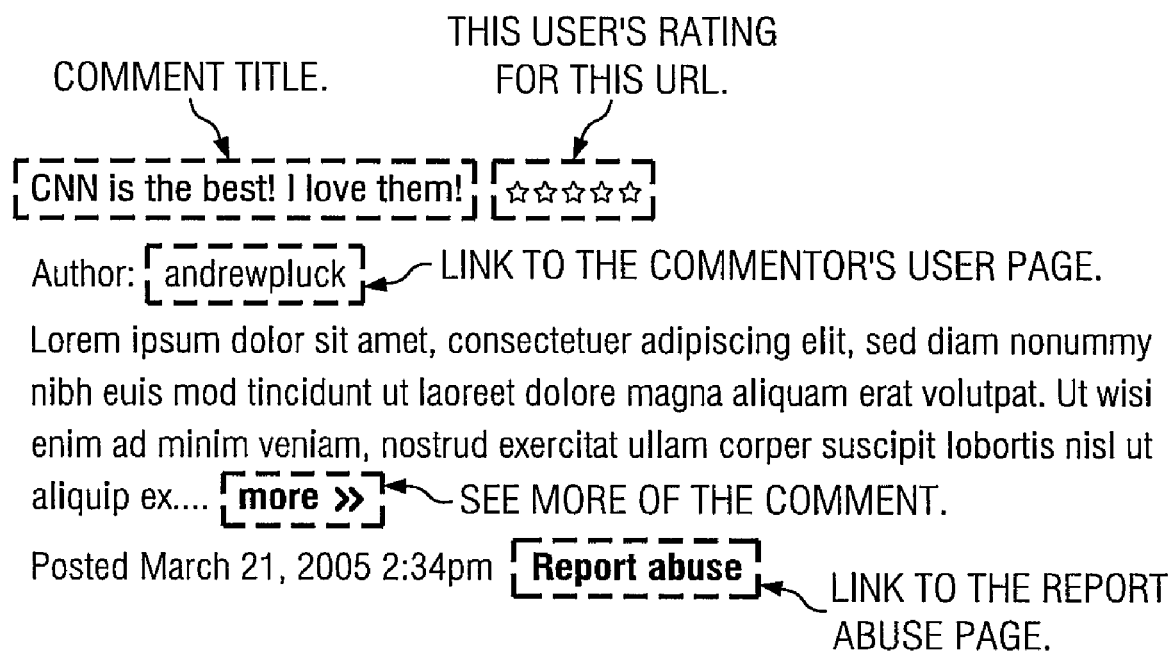
FIG. 12 is a notated illustration of a region of the screen of FIG. 11.

As shown in a region 1106, an example comment and rating have been entered by a different user (whose login name is "andrewpluck") in relation to the web page. FIG. 12 is a notated illustration of the region 1106, which is self-explanatory. As indicated in FIG. 12, the displayed links are selectable (e.g., clickable) as hyperlinks by the user. In response to the user clicking a "See all comments" hyperlink in a region 1108, the server outputs additional signals to the user's computer, resulting in display of a screen 1400 (FIG. 14). In response to the user clicking a "Post a comment" hyperlink in a region 1112, the server outputs additional signals to the user's computer, resulting in display of the screen 1300 (FIG. 13), which is discussed further hereinbelow.

In response to the user clicking a "Tell A Friend About This Page" hyperlink in a region 1110, the server outputs additional signals to the user's computer, resulting in display of a screen 1500*a* (FIG. 15*a*), which is discussed further hereinbelow.

In response to the user clicking a suitable button in a region 1114, the server outputs an RSS feed to the user's computer from the user-selected source (e.g., from the cnn.com domain, which is the domain that includes the web page whose "shadow" page is displayed in the screen 1100).

In response to the user clicking a "Tag this site" hyperlink in a region 1116, the server outputs additional signals to the user's computer, resulting in display of the screen 1300 (FIG. 13), which is discussed further hereinbelow.

In response to the user clicking a "Subscribe to updates for this Shadow page:" button in the screen 1100, the server writes a reminder for storage in a database of its computer-readable medium, so that the server will periodically send e-mail messages to the user. Such e-mail messages contain updated information (e.g., the server's updated version of the screen 1100) about the "shadow" page that is shown in FIG. 11.

Also, the screen 1100 includes a tag rank of the web page. In the example of FIG. 11, the web page has a #4 tag rank (as displayed in the screen 1100), such that the web page received the $4^{th}$ highest number of tags among the various web pages that have been tagged by one or more registered users.

Further, the screen 1100 includes a list of tags that have been most frequently assigned to the web page by the registered users. In the example of FIG. 11: (a) the "news" tag has been assigned to the web page by the registered users, more frequently than any other tag; and (b) the "cool" tag has been assigned to the web page by the registered users, with the $2^{nd}$ highest frequency.

Referring to the screen 1300 (FIG. 13), in response to the user clicking a radio button in a region 1302 and clicking a "Submit" button of the screen 1300, the server: (a) records the user's rating of the web page (http://www.cnn.com/2005/US/Careers/04/15/spring.cleaning/index.html); and (b) according to a page rating technique, averages such user's rating of the web page with such ratings by other registered users.

In response to the user entering information in a "My comment" field and clicking a "Submit" button of the screen 1300, the server records such comment about the web page.

Moreover, with the screen 1300, the user has an option of assigning tags to the web page. In response to the user entering one or more tags in a field 1304 and clicking a "Submit" button of the screen 1300, the server records such tags as being assigned to the web page by such user. Referring to the screen 300*a* (FIG. 3*a*), if the user clicked the "No" radio button in the region 306, then the server later withholds all of the user's assigned tags from the region 612 (FIG. 6), so that such tags are unavailable for viewing by other users. Similarly, even if the user clicked the "Yes" radio button in the region 306, if the user nevertheless selects the "keep my tags private" box in the region 1304, then the server later withholds such tags (to the extent that the user contemporaneously enters such tags in the field 1304 and clicks a "Submit" button of the screen 1300) from the region 612 (FIG. 6), so that such tags are unavailable for viewing by other users.

In response to the user specifying one or more e-mail addresses in a field 1306 and clicking a "Send" button of the screen 1300, the server: (a) records the user's rating (if selected in the region 1302) of the web page; (b) according to a page rating technique, averages such user's rating of the web page with such ratings by other registered users; (c) records the user's comment (if specified in the "My comment" filed) about the web page; (d) records tags assigned to the web page by the user (to the extent that the user contemporaneously enters such tags in the field 1304); and (e) to the user-specified e-mail address(es) (as specified by the user in the field 1306), sends an e-mail message that contains information (e.g., the server's cached version of the screen 1100) about the web page (http://www.cnn.com/2005/US/Careers/04/15/spring.cleaning/index.html) and about such user's:

(i) rating;
(ii) comment; and
(iii) tags, unless the user clicked the "No" radio button in the region 306, or unless the user contemporaneously selects the "keep my tags private" box in the region 1304.

The server records such rating, average, comment, tags, and privacy option by writing them for storage in a database of its computer-readable medium. In one embodiment, the page rating technique is a weighted average, so that newer ratings are weighted more heavily than older ratings.

Figure 15B:
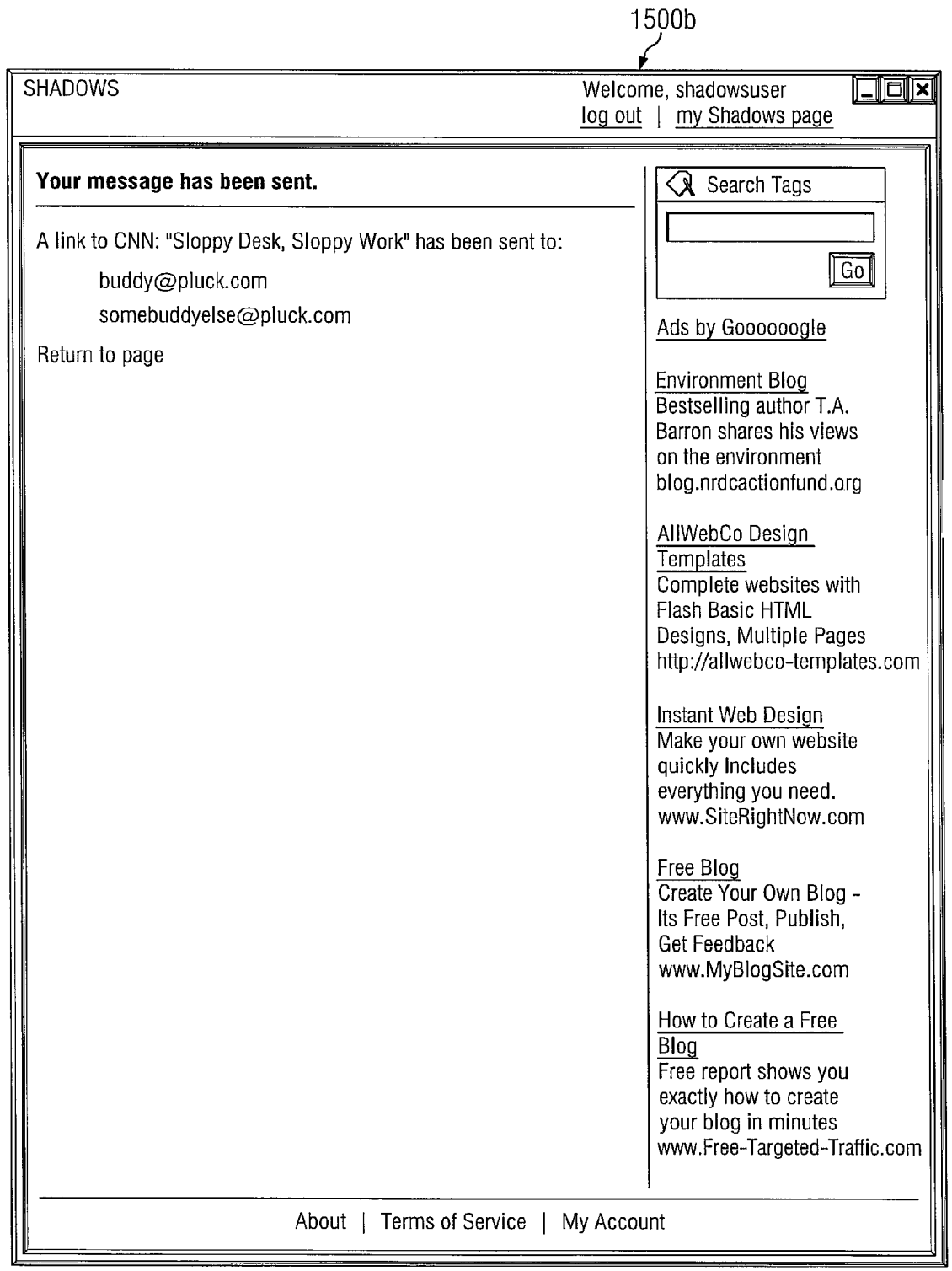
FIG. 15b is an illustration of a screen displayed by the display device of the representative client of FIG. 2.

Referring to FIG. 11, in response to the user clicking a "Tell A Friend About This Page" hyperlink in the region 1110, the server outputs additional signals to the user's computer, resulting in display of the screen 1500*a* (FIG. 15*a*). If the user is logged into his or her account, then the server will automatically specify the user's e-mail address in a field 1502. In response to the user specifying the user's e-mail address in the field 1502 (if not automatically specified by server), and specifying one or more e-mail addresses in a field 1504, and clicking a "Submit" button of the screen 1500*a*: (a) to the e-mail address(es) (as specified by the user in the field 1504), the server sends an e-mail message that contains a hyperlink to (or, alternatively, an HTML version of) the server's cached version of the screen 1100 (FIG. 11); and (b) the server outputs additional signals to the user's computer, resulting in display of a screen 1500*b* (FIG. 15*b*) by the display device.

Figure 16A:
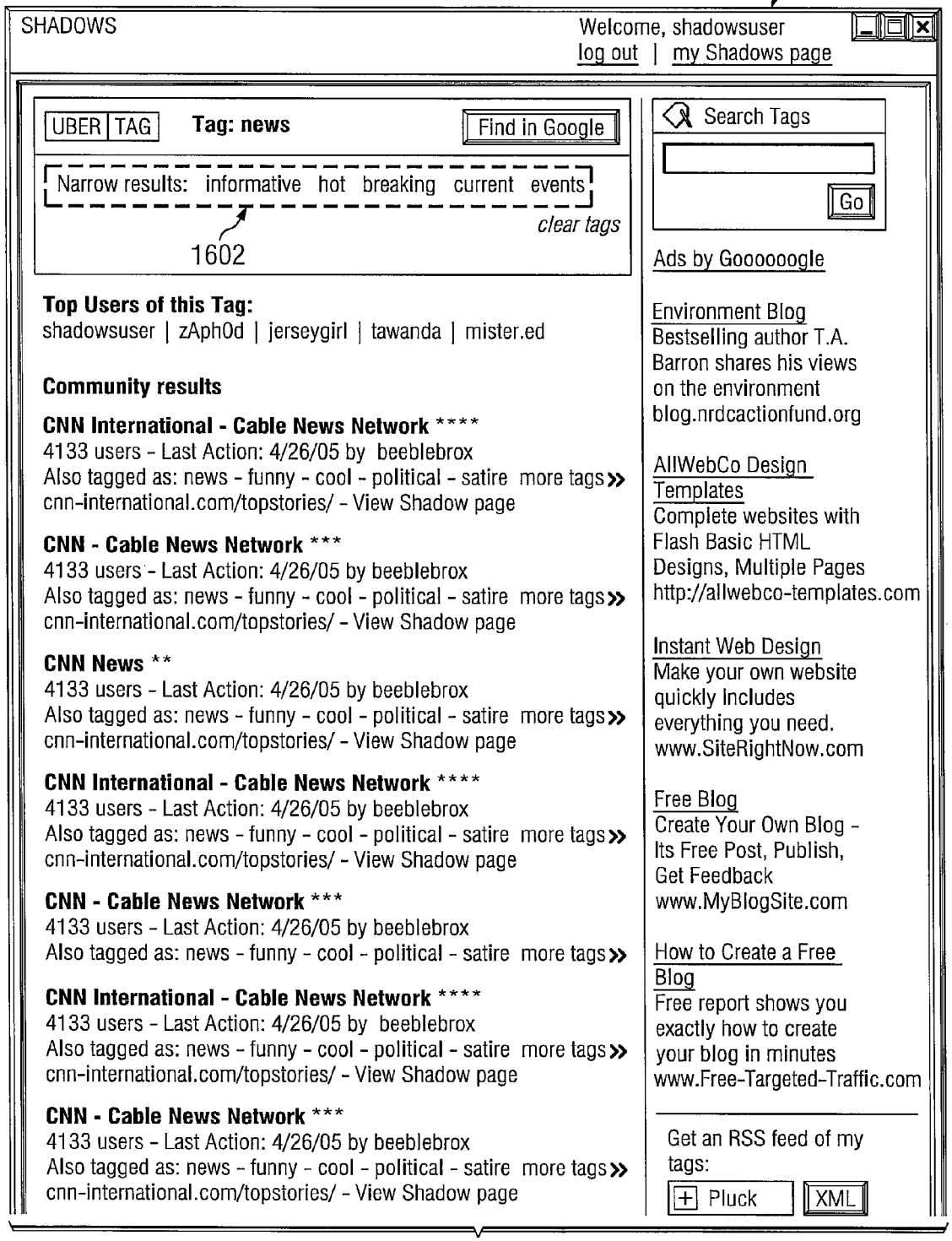
FIG. 16 is an illustration of a screen displayed by the display device of the representative client of FIG. 2.

Referring to FIG. 7, in response to the user clicking an ubertag (e.g., "news" ubertag) in the region 710, the server outputs additional signals to the user's computer, resulting in display of a screen 1600 of FIG. 16. The screen 1600 is similar to the screen 800a (FIG. 8a), including similar functionality, as identified in the screen 1600. For example, in a region 1602 of the screen 1600, the user is able to view a list of displayed tags (other than ubertags) that would narrow the user's search query, as further illustrated in FIG. 9. Referring simultaneously to FIGS. 9 and 16: (a) the "news" ubertag in FIG. 16 is an example of a Tag 1 in FIG. 9; and (b) the "informative," "hot," "breaking," "current," and "events" tags in FIG. 16 are examples of Tags 2, 3, 4 and 5 in FIG. 9. By viewing such information, a user receives valuable guidance on candidate tags to consider specifying in narrowing the user's search query.

FIG. 17a shows a "shadow" page for the web domain http://www.cnn.com/, and for its subdirectory web page http://www.cnn.com/2005/US/Careers/04/15/spring.cleaning/index.html. The web domain includes all of its various subdomain and subdirectory web pages. In response to the user clicking the "This Page's Shadow" command button 404 or 414 of FIG. 4, the server outputs additional signals to the user's computer, resulting in display of the screen 1700a (FIG. 17a) by the display device, if no registered user has yet entered a comment about the web page that is displayed in the screen 400, yet such web page is a subdomain or subdirectory web page of the web domain whose "shadow" page is displayed in the screen 1700a. In one embodiment, if multiple URLs address the same web domain, then the server: (a) associates such URL addresses with the same "shadow" page as one another, even if such URL addresses are otherwise different from one another (e.g., multiple URL addresses such as www.cnn.com, www.cnn.com/index.html, and www.cnn.com/index.htm, which address the same web domain); and (b) likewise, associates such "shadow" page with such URL addresses.

The screen 1700a is similar to the screen 1100 (FIG. 11), including similar functionality, as identified in the screen 1700a. For example, in the screen 1700a, the user is able to view summary rating and categorization information about the web page, and about the web domain. Such information is assembled by the server in response to various commentary (e.g., comments, votes, ratings, tags) about the web page by the group of registered users of the system 100, and in response to other activities by the group of registered users of the system 100.

Near the top of FIG. 17a, the screen 1700a displays a result of the registered users' voting for ubertags in relation to the web page. The server assigns weights to such ubertag votes, so that newer votes are weighted more heavily than older votes. In the example of FIG. 17a, the highest scoring ubertags (in relation to the web page) are "News" and "Recommended." Also, by clicking one of the ubertags listed in a region 1706, the user is able to vote for such ubertag in relation to the web page.

The registered users are able to rate the web page by assigning a number of stars to the web page, as discussed further hereinabove in connection with FIG. 13. Near the top of FIG. 17a (adjacent to the list of highest scoring ubertags in relation to the web page), the screen 1700a displays such users' average rating of the web page. In the example of FIG. 17a, the average user rating of the web page is five stars, as shown in the screen 1700a. In response to the user clicking a "Rate it" hyperlink near the top of FIG. 17a (adjacent to the list of highest scoring ubertags in relation to the web page), the server outputs additional signals to the user's computer, resulting in display of the screen 1300 (FIG. 13), which is discussed further hereinabove.

In response to the user clicking a "Be the first to comment on this page!" hyperlink in the screen 1700a, the server outputs additional signals to the user's computer, resulting in display of the screen 1300 (FIG. 13), which is discussed further hereinabove. Likewise, in response to the user clicking a "Tag this site" hyperlink in a region 1708, the server outputs additional signals to the user's computer, resulting in display of the screen 1300 (FIG. 13), which is discussed hereinabove. In response to the user clicking a "Tell A Friend About This Page" hyperlink in the screen 1700a, the server outputs additional signals to the user's computer, resulting in display of the screen 1500a (FIG. 15a), which is discussed further hereinabove.

Similarly, the registered users are able to rate the web domain (e.g., http://www.cnn.com/) by assigning a number of stars to the web domain, similar to the manner discussed further hereinabove in connection with FIG. 13. In a region 1702, the screen 1700a displays such users' average rating of the web domain. In the example of FIG. 17a, the average user rating of the web domain is three stars, as shown in the region 1702. In response to the user clicking a "Rate it" hyperlink in the region 1702, the server outputs additional signals to the user's computer, resulting in display of a screen that is similar to the screen 1300 (FIG. 13) discussed hereinabove, but which relates to the web domain (e.g., http://www.cnn.com/) instead of the web page (e.g., http://www.cnn.com/2005/US/Careers/04/15/spring.cleaning/index.html).

As shown in the region 1702, an example comment and rating have been entered by different users (whose login names are "barrypluck," "andrewpluck," and "johnpluck") in relation to the web domain. In response to the user clicking a "See all comments" hyperlink in the region 1702, the server outputs additional signals to the user's computer, resulting in display of a screen that is similar to the screen 1400 (FIG. 14) discussed hereinabove, but which relates to the web domain (e.g., http://www.cnn.com/) instead of the web page (e.g., http://www.cnn.com/2005/US/Careers/04/15/spring.cleaning/index.html). In response to the user clicking a "Post a comment" hyperlink in the region 1702, the server outputs additional signals to the user's computer, resulting in display of a screen that is similar to the screen 1300 (FIG. 13) discussed hereinabove, but which relates to the web domain (e.g., http://www.cnn.com/) instead of the web page (e.g., http://www.cnn.com/2005/US/Careers/04/15/spring.cleaning/index.html).

In response to the user clicking a "Subscribe to updates for this Shadow page:" button in the screen 1700a, the server writes a reminder for storage in a database of its computer-readable medium, so that the server will periodically send e-mail messages to the user. Such e-mail messages contain updated information (e.g., the server's updated version of the screen 1700a) about the "shadow" page that is shown in FIG. 17a.

Further, in response to a situation in which no registered user has yet assigned a tag to the web page that is displayed in the screen 400 (and whose URL address is listed near the top of the screen 1700a), instead the screen 1700a includes a list of tags that have been most frequently assigned to the web domain (which includes such web page) by the registered users. In the example of FIG. 17a: (a) the "news" tag has been assigned to the web domain by the registered users, more frequently than any other tag; and (b) the "cool" tag has been assigned to the web domain by the registered users, with the $2^{nd}$ highest frequency.

FIG. 17b shows a "shadow" page for the web domain http://www.cnn.com/. For example, if the screen 400 of FIG. 4 displays a homepage (e.g., http://www.cnn.com/) of the web domain, then in response to the user clicking the "This Page's Shadow" command button 404 or 414 of FIG. 4, the server outputs additional signals to the user's computer, resulting in display of the screen 1700b (FIG. 17b) by the display device.

In relation to the web domain, the screen 1700b has the same functionality as the screen 1700a (FIG. 17a), plus additional functionality as discussed hereinbelow. For example, in the screen 1700b, the user is able to view summary rating and categorization information about the web domain. Such information is assembled by the server in response to various comments, votes, ratings and other activities by the group of registered users of the system 100.

Near the top of FIG. 17b, the screen 1700b displays a result of the registered users' voting for ubertags in relation to the web domain. The server assigns weights to such ubertag votes, so that newer votes are weighted more heavily than older votes. In the example of FIG. 17b, the highest scoring ubertags (in relation to the web domain) are "News" and "Recommended." Also, by clicking one of the ubertags listed in a region 1710, the user is able to vote for such ubertag in relation to the web domain.

The registered users are able to rate the web domain (e.g., http://www.cnn.com/) by assigning a number of stars to the web domain, as discussed further hereinabove in connection with FIG. 17a. Near the top of FIG. 17b (adjacent to the list of highest scoring ubertags in relation to the web domain), the screen 1700b displays such users' average rating of the web domain. In the example of FIG. 17b, the average user rating of the web domain is five stars, as shown in the screen 1700b. In response to the user clicking a "Rate it" hyperlink in the screen 1700b, the server outputs additional signals to the user's computer, resulting in display of a screen that is similar to the screen 1300 (FIG. 13) discussed hereinabove, but which relates to the web domain (e.g., http://www.cnn.com/) instead of the web page (e.g., http://www.cnn.com/2005/US/Careers/04/15/spring.cleaning/index.html).

In response to the user clicking a "Tag this site" hyperlink in a region 1712, the server outputs additional signals to the user's computer, resulting in display of a screen that is similar to the screen 1300 (FIG. 13) discussed hereinabove, but which relates to the web domain (e.g., http://www.cnn.com/) instead of the web page (e.g., http://www.cnn.com/2005/US/Careers/04/15/spring.cleaning/index.html). In response to the user clicking a "Tell A Friend About This Page" hyperlink in the screen 1700b, the server outputs additional signals to the user's computer, resulting in display of a screen that is similar to the screen 1500a (FIG. 15) discussed hereinabove, but which relates to the web domain (e.g., http://www.cnn.com/) instead of the web page (e.g., http://www.cnn.com/2005/US/Careers/04/15/spring.cleaning/index.html).

Further, the screen 1700b includes a list of tags that have been most frequently assigned to the web domain by the registered users. In the example of FIG. 17b: (a) the "news" tag has been assigned to the web domain by the registered users, more frequently than any other tag; and (b) the "cool" tag has been assigned to the web domain by the registered users, with the $2^{nd}$ highest frequency.

In a region 1714, the screen 1700b displays a list of the web domain's subdomain and subdirectory pages that received the highest average user ratings, among the web domain's various subdomain and subdirectory pages that have been tagged by one or more registered users.

Figure 18:
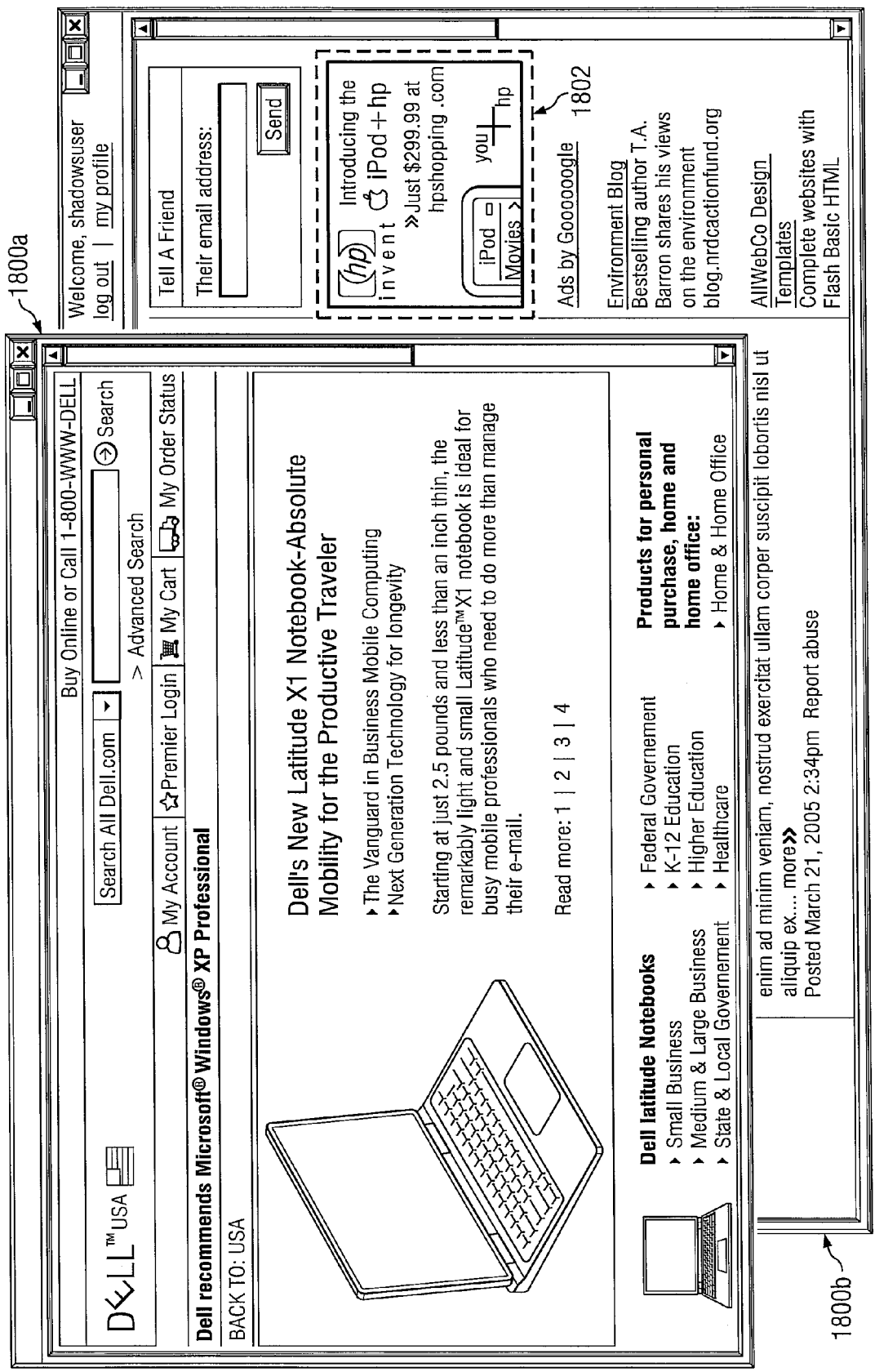
FIG. 18 is an illustration of a screen displayed by the display device of the representative client of FIG. 2.

Referring to FIG. 18, the server tracks and manages information about the nature of domains. In response to such information, the server displays context-sensitive advertisements and promotional offers on various shadow pages. For example, in FIG. 18: (a) a screen 1800a, which is displayed by the device within a web browser window in response to signals from the server, shows a page from the dell.com domain; and (b) a screen 1800b, which is displayed by the device within a web browser window in response to signals from the server, shows a shadow page associated with screen 1800a. In the screen 1800b, a region 1802 includes one or more advertisements and promotional offers, which are selected by the server in response to: (a) its execution of selection software; and (b) content of the dell.com domain, from which the screen 1800a was downloaded, and/or other content of the screens 1800a and/or 1800b.

The selection software includes programming for selecting such advertisements and promotional offers, according to potential interest by customers who view the screen 1800a and/or other web pages from the dell.com domain and/or the screen 1800b, and according to fees paid to an operator of the server by sponsors of such advertisements and promotional offers. In the example of FIG. 18, the screen 1800a includes content about DELL notebook computers. In response to such content and/or content in other web pages from the dell.com domain and/or the screen 1800b, the selection software determines that such customers (viewing the screen 1800a and/or other web pages from the dell.com domain and/or the screen 1800b) would have potential interest in an IPOD product that is offered for sale by HEWLETT-PACKARD, which is a competitor of DELL. Accordingly, the server selects HEWLETT-PACKARD'S IPOD advertisement for display in the region 1802.

Figure 19A:
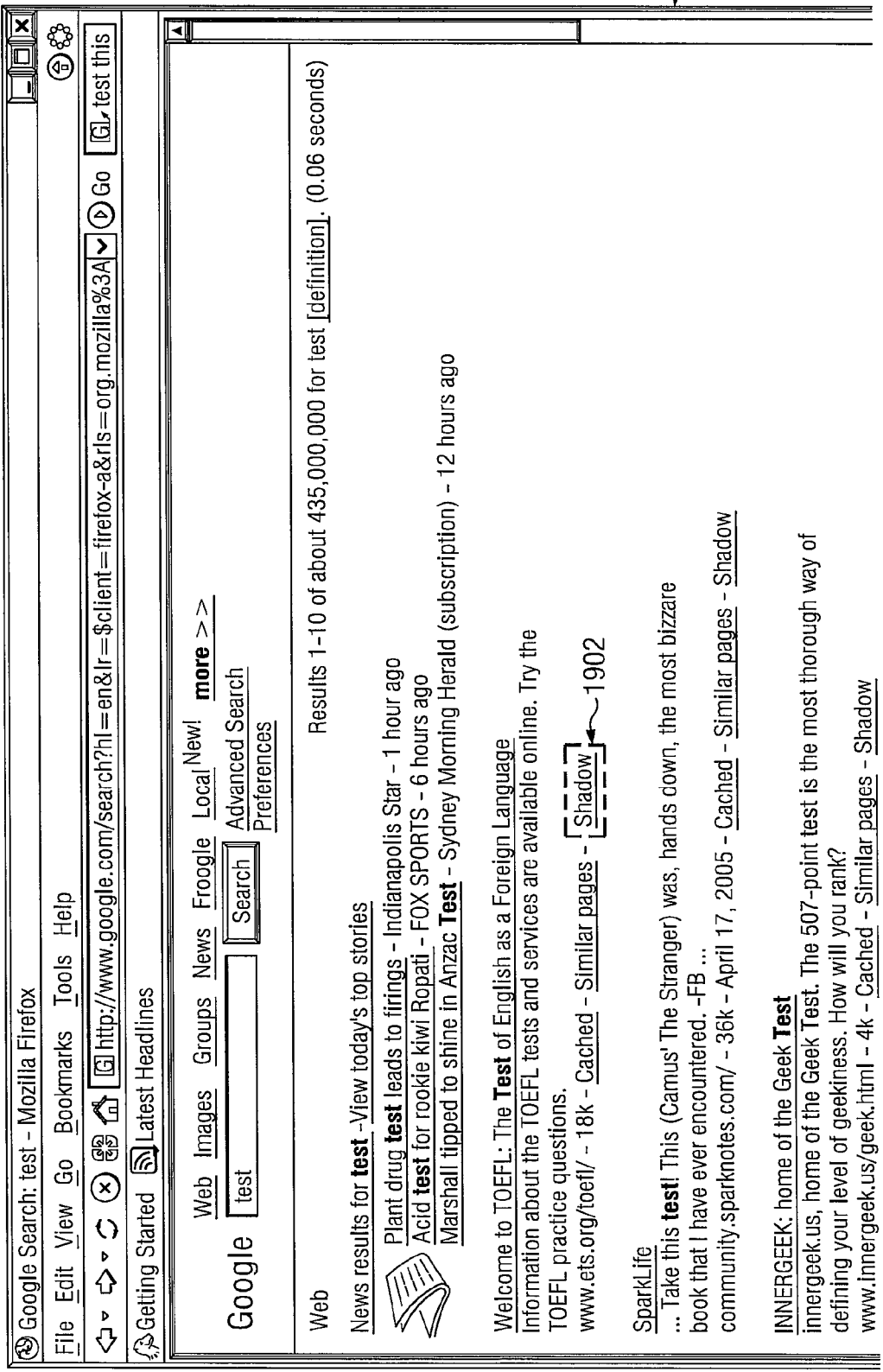
FIG. 19 is an illustration of a screen displayed by the display device of the representative client of FIG. 2.
Figure 19B:
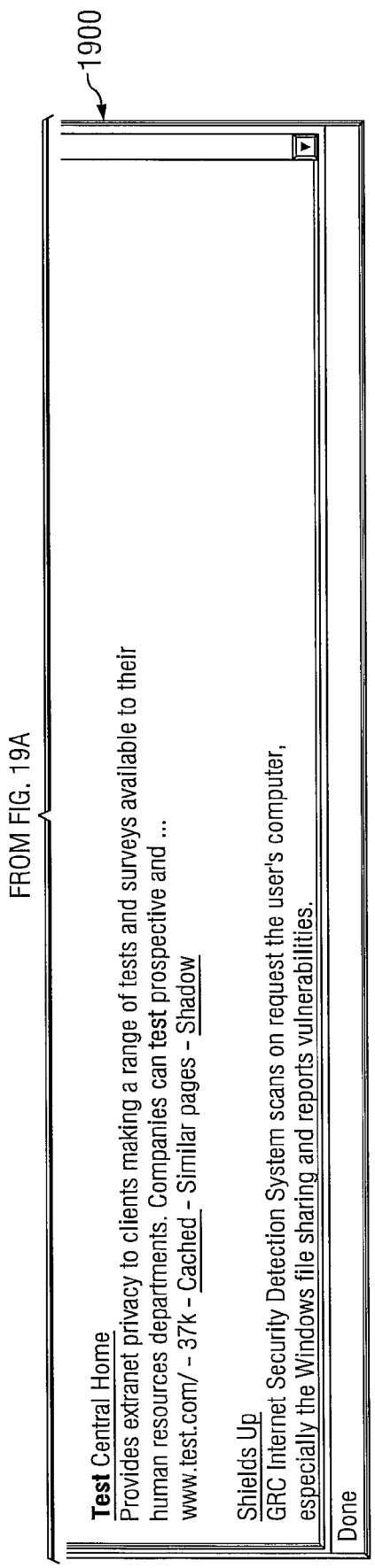

FIG. 19 is an illustration of a screen, which includes a listing of web pages, in response to a query that was entered by the user via an internet search engine (e.g., via GOOGLE). A hyperlink region 1902 includes a first "shadow" button. In response to the user clicking the region 1902, the server outputs additional signals to the user's computer, resulting in display of a shadow page for a web page www.ets.org/toefl/ (similar to the manner in which the server outputs additional signals to the user's computer in response to the user clicking a "This Page's Shadow" command button 404 or 414 of FIG. 4, which results in display of either the screen 1100 (FIG. 11) or the screen 1700a (FIG. 17a) by the display device, as discussed further hereinabove in connection with FIGS. 4, 11 and 17).

Also, a hyperlink region 1904 includes a second "shadow" button. In response to the user clicking the region 1904, the server outputs additional signals to the user's computer, resulting in display of a shadow page for a web page www-.community.sparknotes.com/ (similar to the manner in which the server outputs additional signals to the user's computer in response to the user clicking a "This Page's Shadow" command button 404 or 414 of FIG. 4, which results in display of either the screen 1100 (FIG. 11) or the screen 1700a (FIG. 17a) by the display device, as discussed further hereinabove in connection with FIGS. 4, 11 and 17).

Further, a hyperlink region 1906 includes a third "shadow" button. In response to the user clicking the region 1906, the server outputs additional signals to the user's computer, resulting in display of a shadow page for a web page www.innergeek.us/geek.html/ (similar to the manner in which the server outputs additional signals to the user's computer in response to the user clicking a "This Page's Shadow" command button 404 or 414 of FIG. 4, which results in display of either the screen 1100 (FIG. 11) or the screen 1700a (FIG. 17a) by the display device, as discussed further hereinabove in connection with FIGS. 4, 11 and 17).

Moreover, a hyperlink region 1908 includes a fourth "shadow" button. In response to the user clicking the region 1908, the server outputs additional signals to the user's computer, resulting in display of a shadow page for a web page www.test.com/ (similar to the manner in which the server outputs additional signals to the user's computer in response to the user clicking a "This Page's Shadow" command button 404 or 414 of FIG. 4, which results in display of either the screen 1100 (FIG. 11) or the screen 1700a (FIG. 17a) by the display device, as discussed further hereinabove in connection with FIGS. 4, 11 and 17).

Figure 20A:
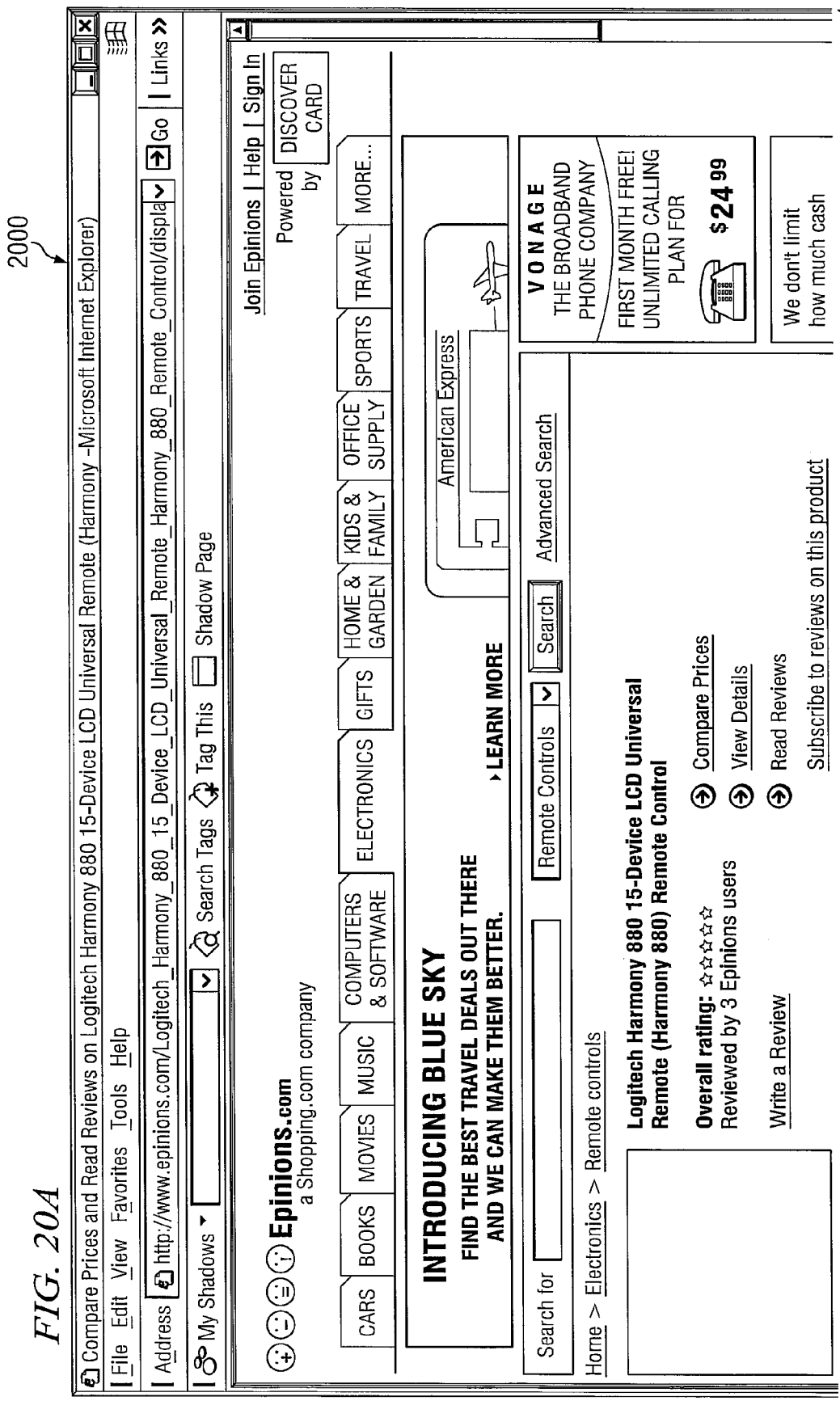
FIG. 20 is an illustration of a screen displayed by the display device of the representative client of FIG. 2.
Figure 20B:
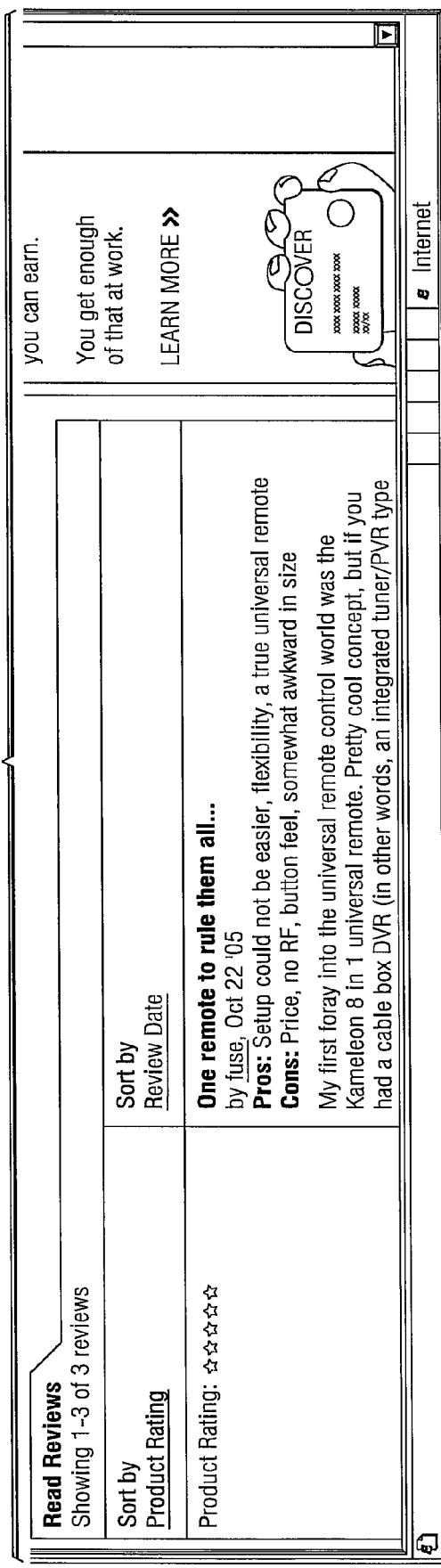

FIG. 20 is an illustration of a web page, indicated generally at 2000, from www.Epinions.com. The web page 2000 includes ratings and reviews of a LOGITECH HARMONY 880 15-device LCD universal remote control product. In this example, the EPINIONS company: (a) collects such ratings and reviews from various users of such product; and (b) operates www.Epinions.com to display such ratings and reviews at the web page 2000.

Figure 21A:
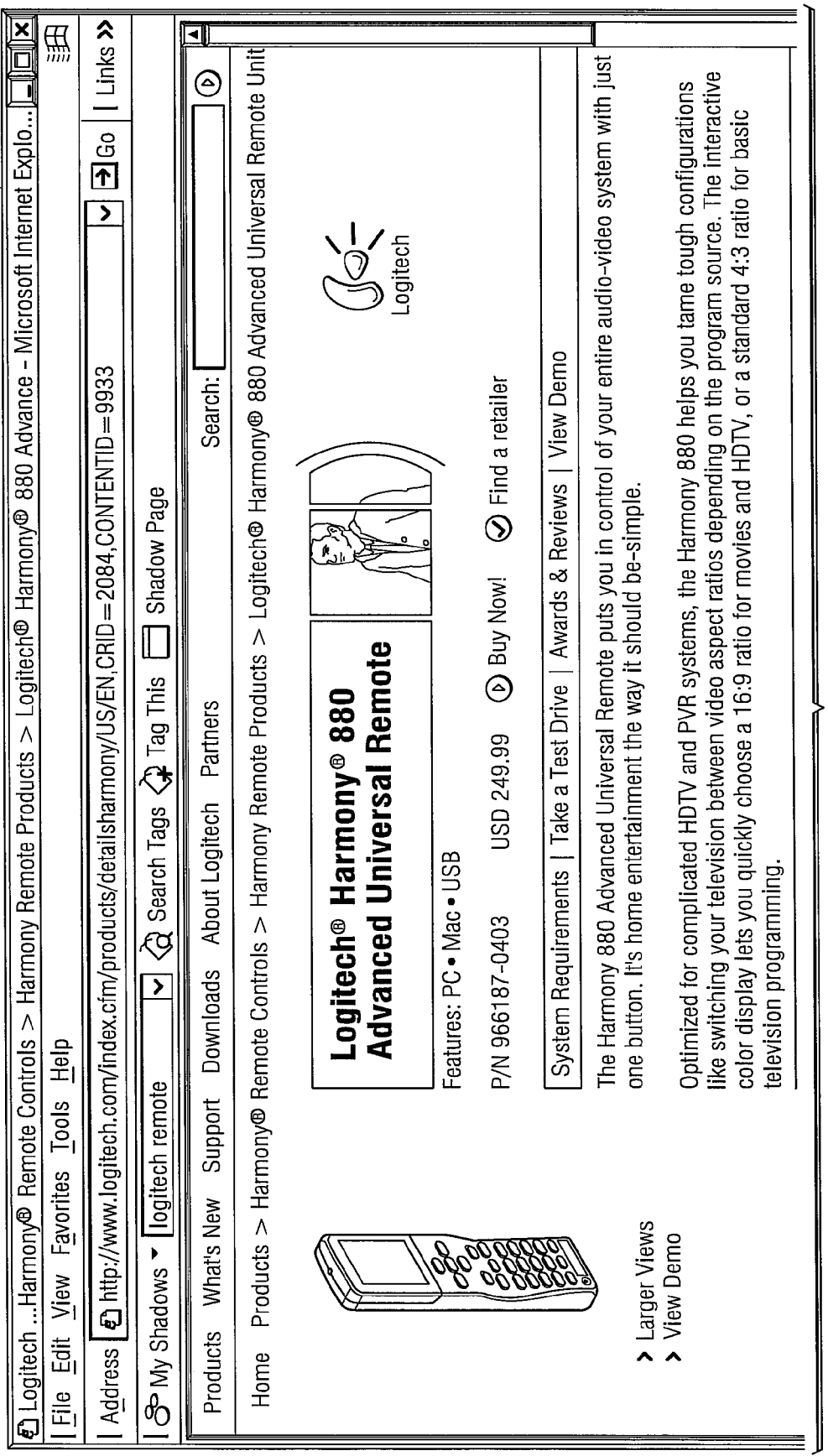
FIG. 21 is an illustration of a screen displayed by the display device of the representative client of FIG. 2.
Figure 21B:
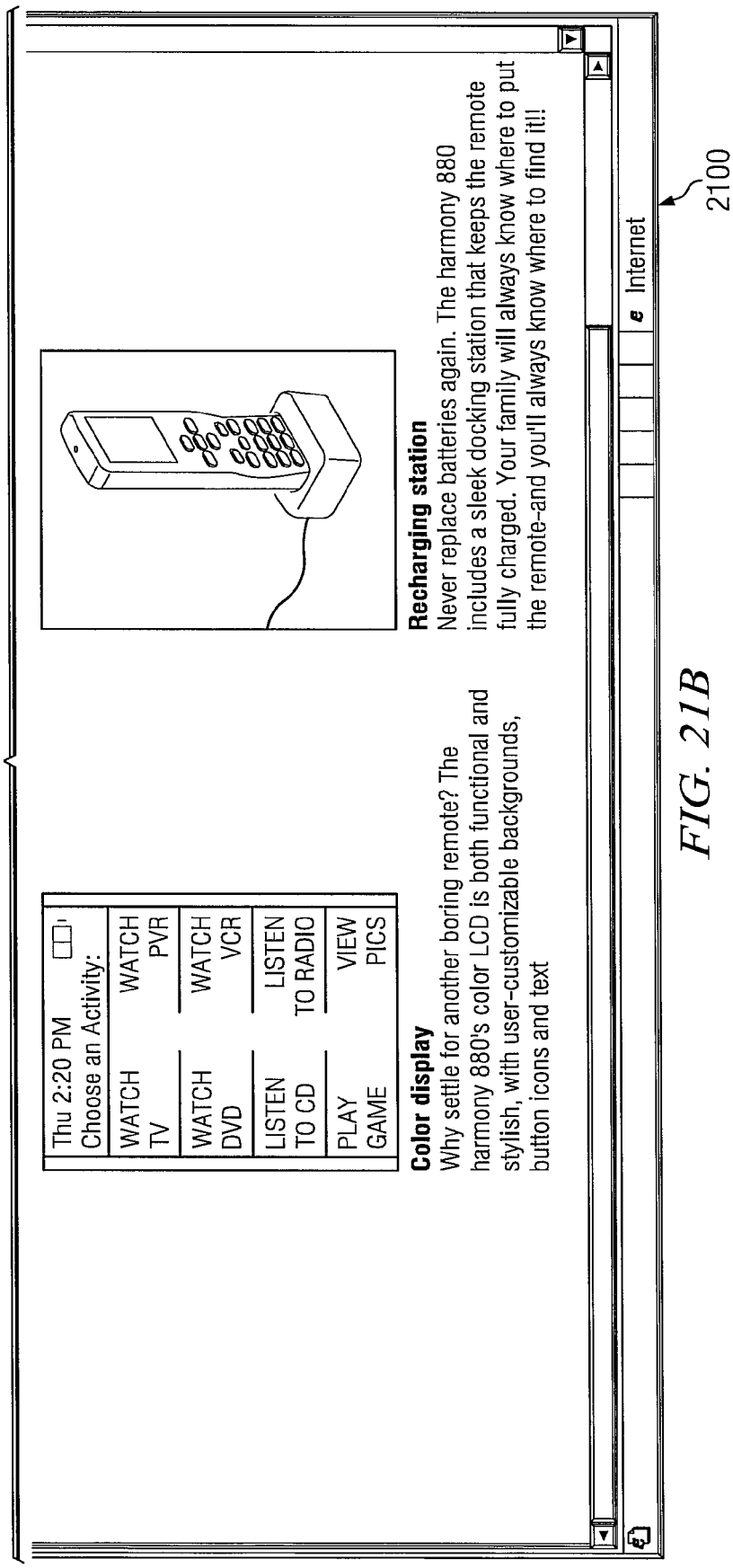

FIG. 21 is an illustration of a web page, indicated generally at 2100, from www.Logitech.com, which is operated by a manufacturer of such product. The web page 2100 includes information about such product.

Figure 22A:
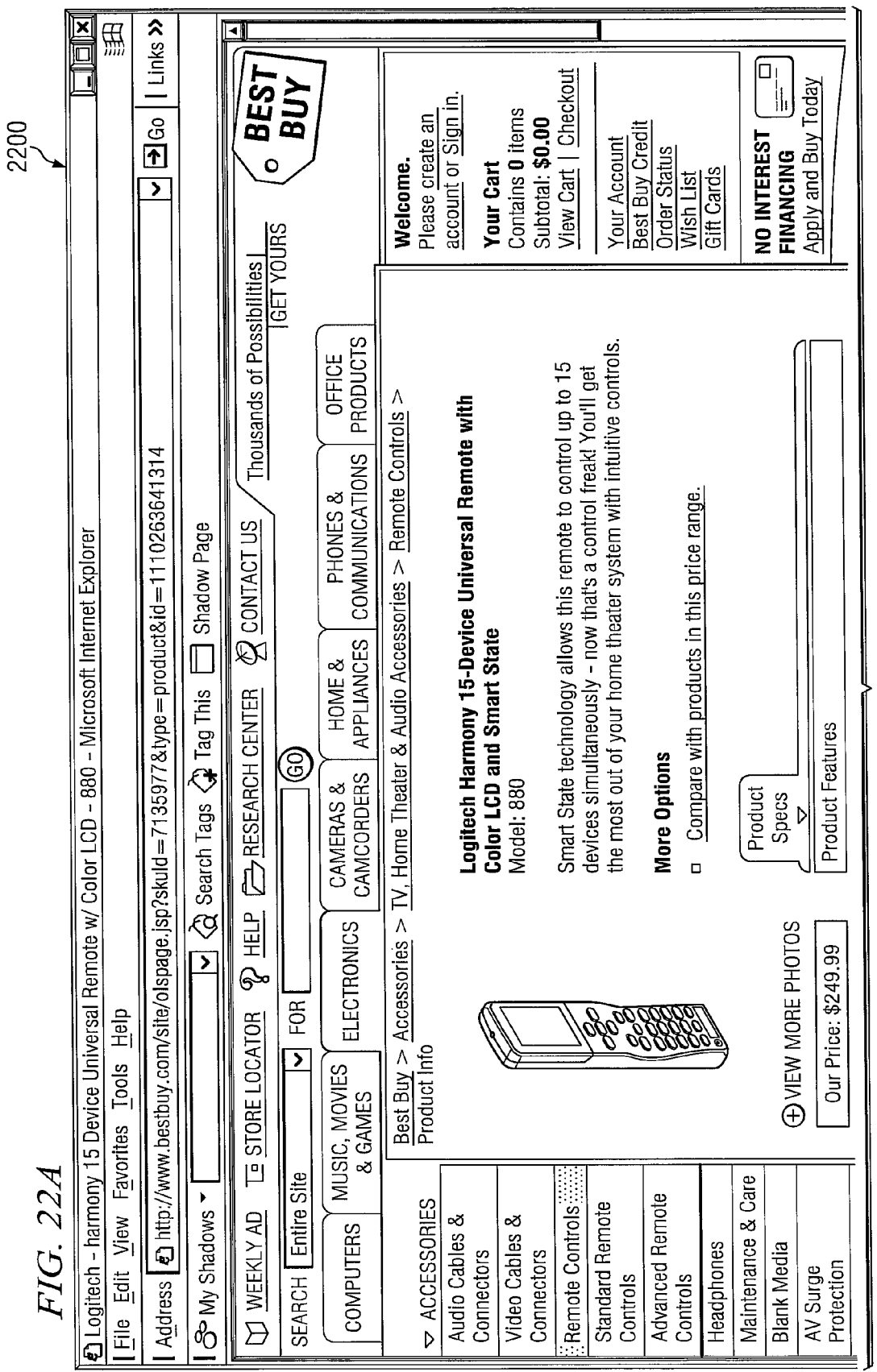
FIG. 22 is an illustration of a screen displayed by the display device of the representative client of FIG. 2.
Figure 22B:
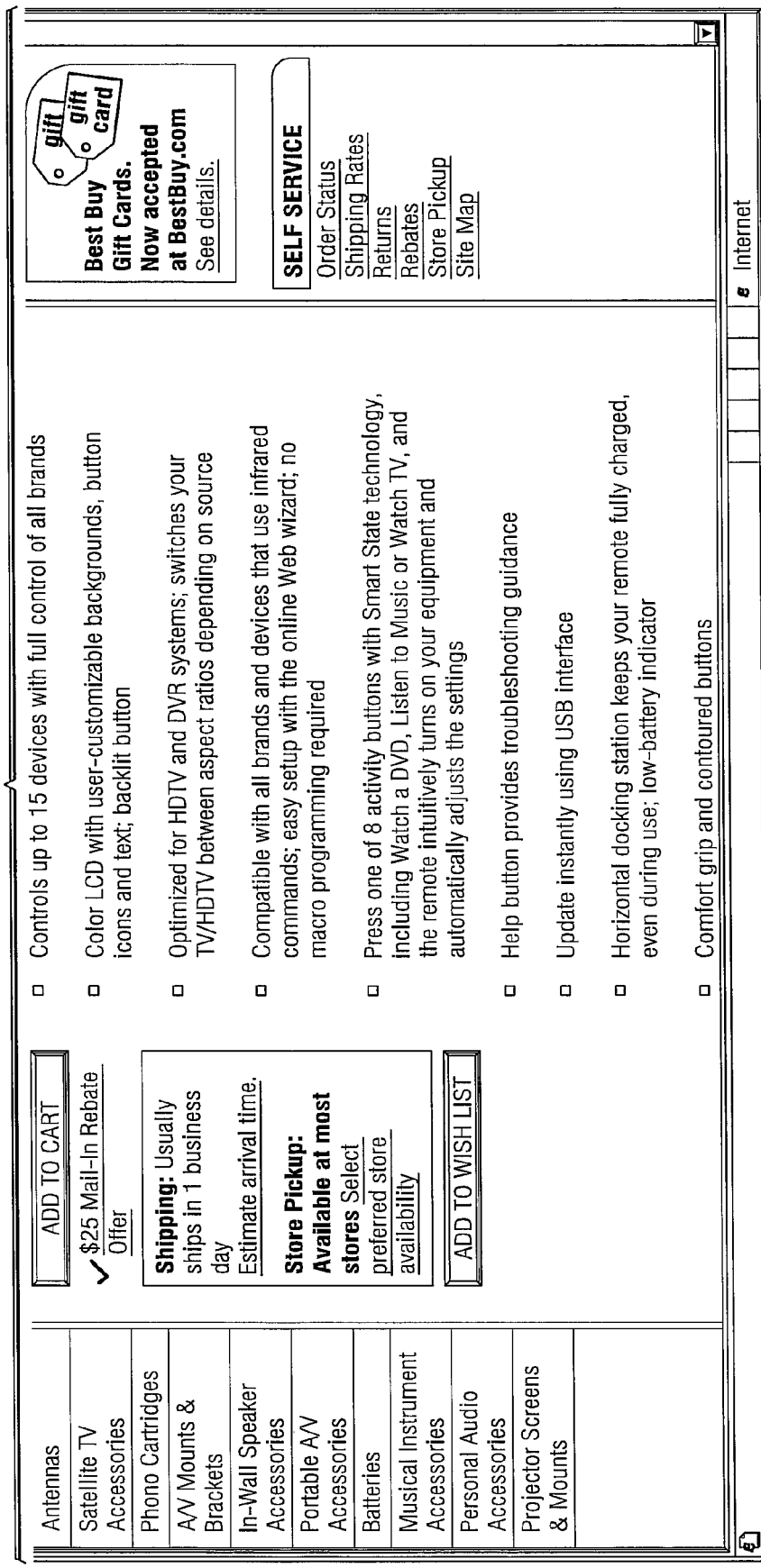

FIG. 22 is an illustration of a web page, indicated generally at 2200, from www.BestBuy.com, which is operated by a merchant of such product. The web page 2200 includes information about such product. By suitably operating the input devices 206 in response to the web page 2200, the user is able to purchase such product from such merchant in a conventional manner.

Figure 23A:
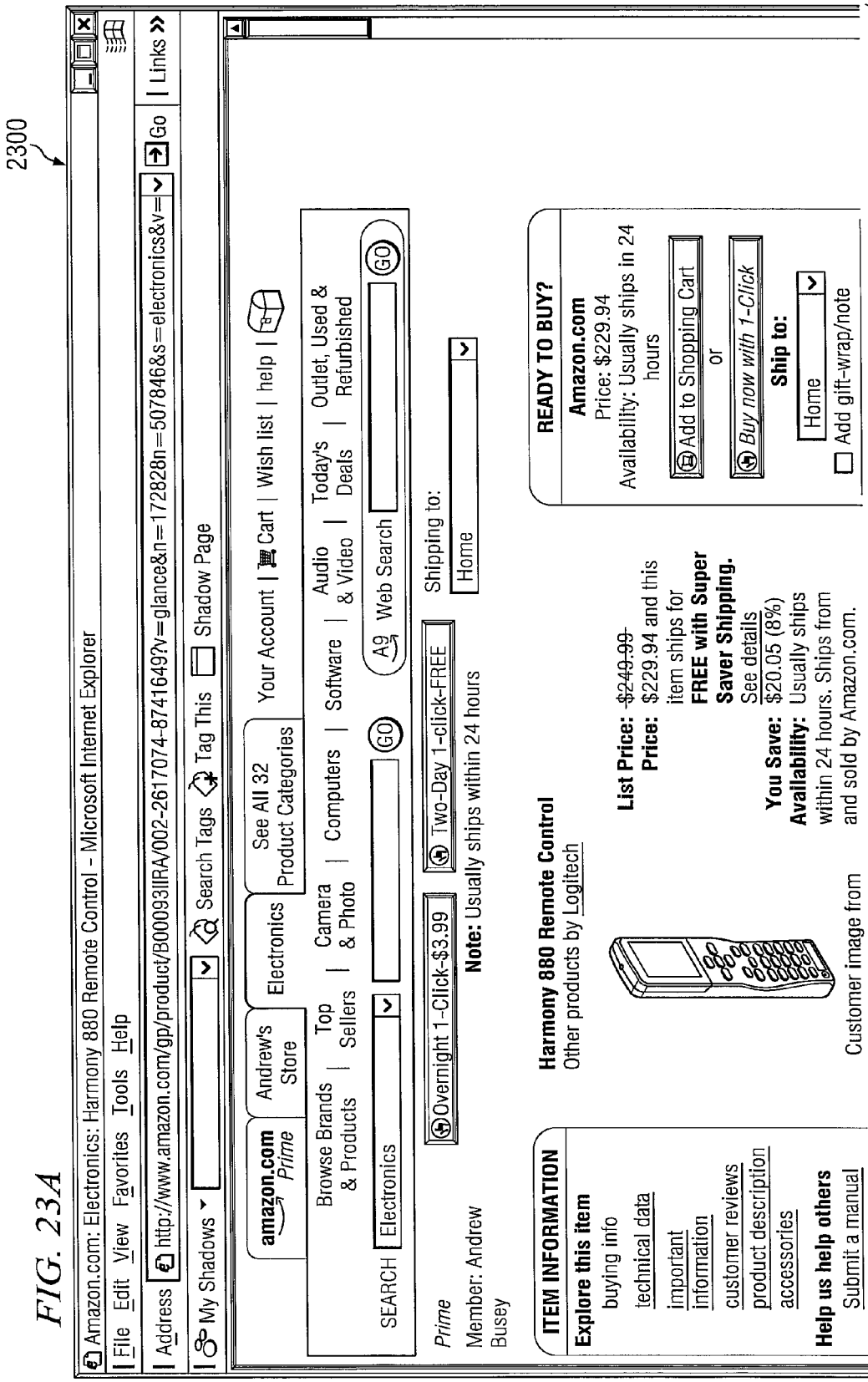
FIG. 23 is an illustration of a screen displayed by the display device of the representative client of FIG. 2.

FIG. 23 is an illustration of a web page, indicated generally at 2300, from www.Amazon.com, which is operated by a merchant of such product. The web page 2300 includes ratings and reviews of such product. In this example, the AMAZON company: (a) collects such ratings and reviews from various users of such product; and (b) operates www.Amazon.com to display such ratings and reviews at the web page 2300. Also, the web page 2300 includes other information about such product. By suitably operating the input devices 206 in response to the web page 2300, the user is able to purchase such product from such merchant in a conventional manner.

FIG. 24 is an illustration of ratings and reviews that are included within the web pages 2000 and 2300.

Figure 25:
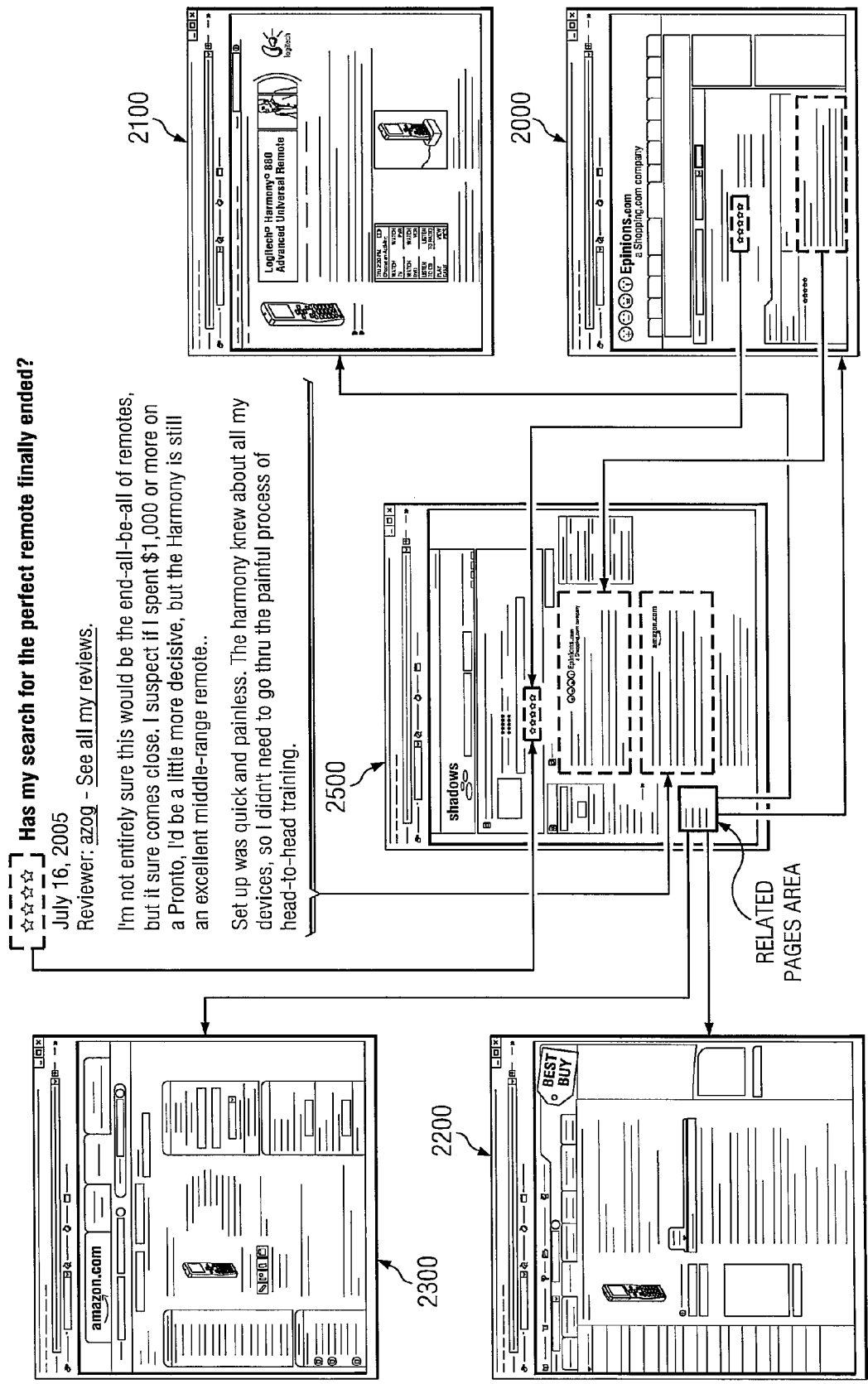
FIG. 25 is an illustration of a screen displayed by the display device of the representative client of FIG. 2.

FIG. 25 shows a "shadow" page, indicated generally at 2500, for such product. As shown in FIG. 25, the "shadow" page 2500 aggregates content from the web pages 2000, 2100, 2200 and 2300, such as the content of FIG. 24. For example, the web page 2500 averages various ratings (e.g., from the web pages 2000 and 2300) of such product, and the web page 2500 displays such average as a "Site Rating" of such product.

Figure 26A:
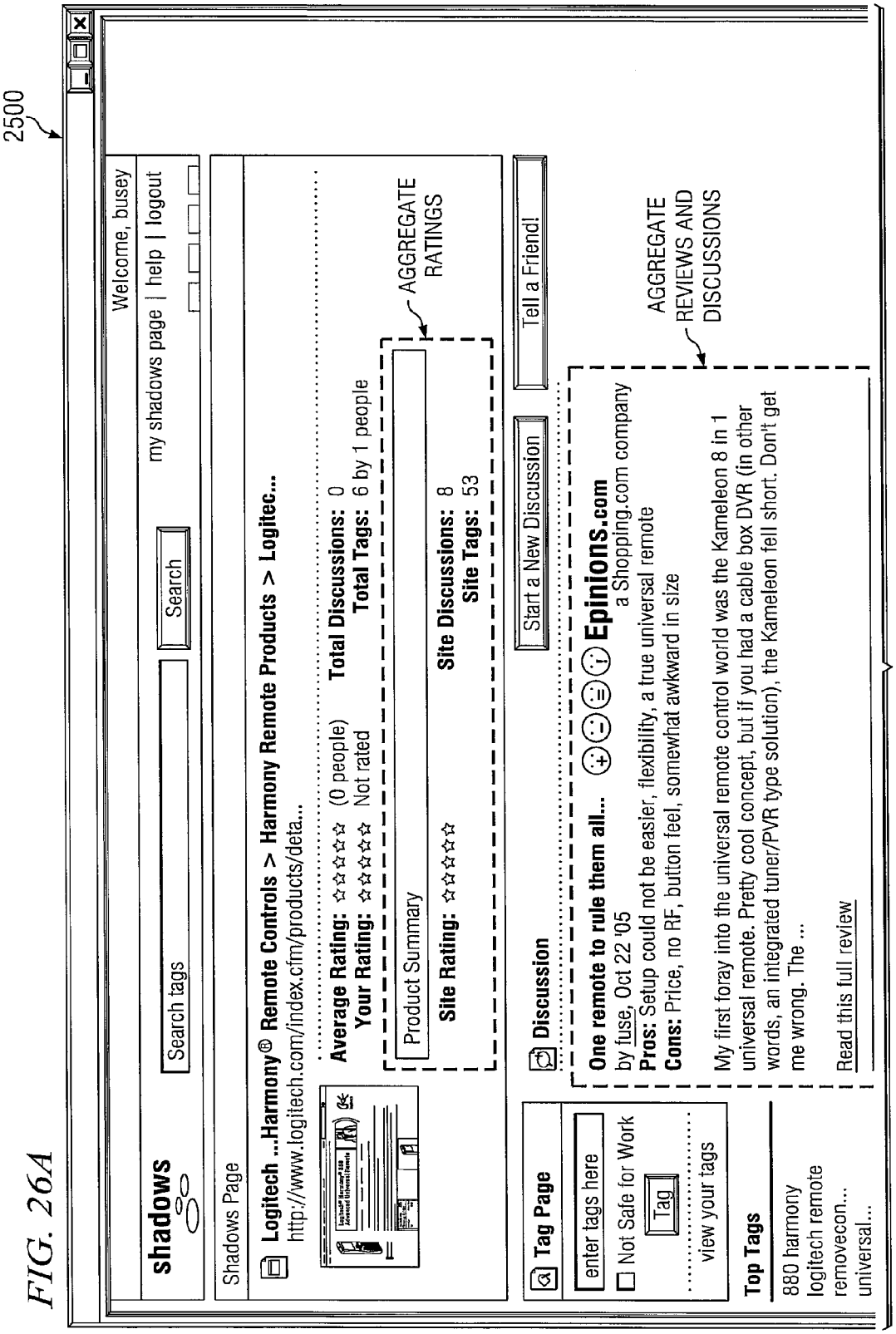
FIG. 26 is an illustration of a screen displayed by the display device of the representative client of FIG. 2.

FIG. 26 shows the same "shadow" page 2500 in more detail. As shown in FIG. 26, in a "Related Pages Area," the "shadow" page 2500 includes hyperlinks to the web page 2000 (via an "Epinions" hyperlink), the web page 2100 (via a "Logitech" hyperlink), the web page 2200 (via a "Best Buy" hyperlink), and the web page 2300 (via an "Amazon" hyperlink). Moreover, as shown in FIG. 26, the "shadow" page 2500 includes hyperlinks to web pages that are operated by other merchants of such product, along with a list of prices that are charged by such merchants for such product.

Accordingly, the web pages 2000, 2100, 2200 and 2300 are focused on the same topic (e.g., such product). In response to such focus, the server: (a) associates URL addresses of the web pages 2000, 2100, 2200 and 2300 with the same "shadow" page 2500 as one another, even if the web pages 2000, 2100, 2200 and 2300 are otherwise different from one another; and (b) likewise, associates such "shadow" page 2500 with such URL addresses.

Referring again to FIG. 2, in one embodiment, the tangible computer-readable medium 212 is a CD-ROM (compact disc, read-only memory). The computer-readable medium 212 and the computer 204 are structurally and functionally interrelated with one another as described further hereinbelow. Each computing device of the illustrative embodiment is structurally and functionally interrelated with a respective computer-readable medium, similar to the manner in which the computer 204 is structurally and functionally interrelated with the computer-readable medium 212. In that regard, the computer-readable medium 212 is a representative one of such computer-readable media, including for example but not limited to the storage device 211.

The computer-readable medium 212 stores (or encodes, or records, or embodies) functional descriptive material (e.g., including but not limited to software (also referred to as computer programs or applications) and data structures). Such functional descriptive material imparts functionality when encoded on the computer-readable medium 212. Also, such functional descriptive material is structurally and functionally interrelated to the computer-readable medium 212.

Within such functional descriptive material, data structures define structural and functional interrelationships between such data structures and the computer-readable medium 212 (and other aspects of the computer 204, the computer system 200 and the system 100). Such interrelationships permit the data structures' functionality to be realized. Also, within such functional descriptive material, computer programs define structural and functional interrelationships between such computer programs and the computer-readable medium 212 (and other aspects of the computer 204, the computer system 200 and the system 100). Such interrelationships permit the computer programs' functionality to be realized.

For example, the computer 204 reads (or accesses, or copies) such functional descriptive material from the computer-readable medium 212 into the memory device of the computer 204, and the computer 204 performs its operations (as described elsewhere herein) in response to such material which is stored in the memory device of the computer 204. More particularly, the computer 204 performs the operation of processing a computer application (that is stored, encoded, recorded or embodied on a computer-readable medium) for causing the computer 204 to perform additional operations (as described elsewhere herein). Accordingly, such functional descriptive material exhibits a functional interrelationship with the way in which the computer 204 executes its processes and performs its operations.

Further, the computer-readable medium is an apparatus from which the computer application is accessible by the computer 204, and the computer application is processable by the computer 204 for causing the computer 204 to perform such additional operations. In addition to reading such functional descriptive material from the computer-readable medium 212, the computer 204 is capable of reading such functional descriptive material from (or through) the network 112, which is also a computer-readable medium (or apparatus). Moreover, the memory device of the computer 204 is itself a computer-readable medium (or apparatus).

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system, comprising:
at least one information handling system having a first storage device maintained at a first remote server, the at least one information handling system configured for:
transmitting code instructions to display, on a display device, within at least one web browser window, a first web page that is associated with an address of a second web page, wherein the first web page is stored on the storage device and includes, about the second web page, received from at least one user terminal, and wherein the code instructions are transmitted in response to a selection by a user of a first hyperlink on a search engine web page, the search engine web page providing a plurality of second hyperlinks for web pages in response to a search engine query, including a second hyperlink for the second web page, the first hyperlink being associated with the second hyperlink for the second web page.

2. The system of claim 1, wherein the information handling system is for:
receiving the commentary from human reviewers.

3. The system of claim 2, wherein the information handling system is for:
in response to the commentary from a particular one of the human reviewers, selecting content, and displaying the selected content to the particular one of the human reviewers within the web browser window on the display device.

4. The system of claim 3, wherein the information handling system is for:
in response to the commentary from the particular one of the human reviewers, selecting the content, according to fees paid to an operator of the information handling system by one or more sponsors of the content, and according to potential interest by the particular one of the human reviewers.

5. The system of claim 4, wherein the content includes one or more advertisements and promotional offers.

6. The system of claim 1, wherein the web browser window includes the web browser toolbar.

7. The system of claim 6, wherein the web browser window includes the web browser toolbar in response to execution of browser plug-in software by the information handling system.

8. The system of claim 1, wherein the information handling system is for:
selecting content for inclusion within the first web page, according to fees paid to an operator of the information handling system by one or more sponsors of the content, and according to potential interest by viewers of at least one of the following: the first web page; and the second web page.

9. The system of claim 8, wherein the content includes one or more advertisements and promotional offers.

10. The system of claim 1, wherein the information handling system is for:
displaying the second web page within the web browser window on the display device, before displaying the first web page within the web browser window on the display device.

11. The system of claim 1, wherein the information handling system so displays the search engine web page within the web browser window on the display device, before the information handling system so displays the first web page within the web browser window on the display device.

12. The system of claim 1, wherein the commentary includes at least one of ratings, comments, votes and tags.

13. The system of claim 1, wherein the first web page is associated with the address of the second web page and with an additional address of the second web page.

14. The system of claim 1, wherein the second web page focuses on a topic, and wherein the first web page is associated with the address of the second web page and with an address of at least one additional web page that focuses on the topic.

15. A method performed by at least one information handling system having a storage device maintained at a remote server, the method comprising:
transmitting code instructions for displaying, on a display device, within at least one web browser window, a first web page that is associated with an address of a second web page, wherein the first web page is stored on the storage device and includes commentary, about the second web page, received from at least one user terminal, and wherein the code instructions are transmitted in response to a selection by a user of a first hyperlink on a search engine web page, the search engine web page providing a plurality of second hyperlinks for web pages in response to a search engine query, including a second hyperlink for the second web page, the first hyperlink being associated with the second hyperlink for the second web page.

16. The method of claim 15, wherein the web browser window includes the web browser toolbar.

17. The method of claim 16, wherein the web browser window includes the web browser toolbar in response to execution of browser plug-in software by the information handling system.

18. The method of claim 1, and comprising:
selecting content for inclusion within the first web page, according to fees paid to an operator of the information handling system by one or more sponsors of the content, and according to potential interest by viewers of at least one of the following: the first web page; and the second web page.

19. The method of claim 18, wherein the content includes one or more advertisements and promotional offers.

20. The method of claim 15, and comprising:
displaying the second web page within the web browser window on the display device, before displaying the first web page within the web browser window on the display device.

21. The method of claim 1, wherein the search engine web page is so displayed within the web browser window on the display device, before the first web page is so displayed within the web browser window on the display device.

22. The method of claim 1, wherein the commentary includes at least one of ratings, comments, votes and tags.

23. The method of claim 1, wherein the first web page is associated with the address of the second web page and with an additional address of the second web page.

24. The method of claim 1, wherein the second web page focuses on a topic, and wherein the first web page is associated with the address of the second web page and with an address of at least one additional web page that focuses on the topic.

25. The method of claim 1, and comprising:
receiving the commentary from at least one user terminal.

26. A computer readable medium having stored thereon a set of instructions, which when executed by a computer having a processor and a storage medium, cause the computer to perform operations, comprising:

transmitting code instructions to display, on a display device, within at least one web browser window, a first web page that is associated with an address of a second web page, wherein the first web page is stored on the storage device and includes commentary, about the second web page, received from at least one user terminal, and wherein the code instructions are transmitted in response to a selection by a user of a first hyperlink on a search engine web page, the search engine web page providing a plurality of second hyperlinks for web pages in response to a search engine query, including a second hyperlink for the second web page, the first hyperlink being associated with the second hyperlink for the second web page.

27. The computer readable medium of claim 26, wherein the web browser window includes the web browser toolbar.

28. The computer readable medium of claim 27, wherein the web browser window includes the web browser toolbar in response to execution of browser plug-in software by the information handling system.

29. The computer readable medium of claim 26, the operations further comprising:

selecting content for inclusion within the first web page, according to fees paid to an operator of the information handling system by one or more sponsors of the content, and according to potential interest by viewers of at least one of the following: the first web page; and the second web page.

30. The computer readable medium of claim 29, wherein the content includes one or more advertisements and promotional offers.

31. The computer readable medium of claim 26, the operations further comprising:

displaying the second web page within the web browser window on the display device, before displaying the first web page within the web browser window on the display device.

32. The computer readable medium of claim 26, wherein the search engine web page is displayed within the web browser window on the display device, before the first web page is displayed within the web browser window on the display device.

33. The computer readable medium of claim 26, wherein the commentary includes at least one of ratings, comments, votes and tags.

34. The computer readable medium of claim 26, wherein the first web page is associated with the address of the second web page and with an additional address of the second web page.

35. The computer readable medium of claim 26, wherein the second web page focuses on a topic, and wherein the first web page is associated with the address of the second web page and with an address of at least one additional web page that focuses on the topic.

36. The computer readable medium of claim 26, the operations further comprising:

receiving the commentary from the at least one user terminal.

37. A computer readable medium having stored thereon a set of instructions, which when executed by a computer having a processor and a storage medium, cause the computer to perform operations, comprising:

associating a first web page with an address of a second webpage, the first web page being stored on the storage device and including commentary, about the second web page, from at least one user terminal; and transmitting code instructions for displaying, on a display device, the first web page, in response to a selection by a user of one of a plurality of first hyperlinks on a search engine web page, the search engine web page providing a plurality of second hyperlinks for web pages in response to a search engine query, including a second hyperlink for the second web page, each first hyperlink being associated with one of the plurality of second hyperlinks for web pages.

* * * * *